US009093077B2

(12) United States Patent
Otani et al.

(10) Patent No.: US 9,093,077 B2
(45) Date of Patent: Jul. 28, 2015

(54) REVERBERATION SUPPRESSION DEVICE, REVERBERATION SUPPRESSION METHOD, AND COMPUTER-READABLE STORAGE MEDIUM STORING A REVERBERATION SUPPRESSION PROGRAM

(75) Inventors: Takeshi Otani, Kawasaki (JP); Masanao Suzuki, Yokohama (JP); Taro Togawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 529 days.

(21) Appl. No.: 13/532,908

(22) Filed: Jun. 26, 2012

(65) Prior Publication Data

US 2013/0077798 A1 Mar. 28, 2013

(30) Foreign Application Priority Data

Sep. 22, 2011 (JP) ................................ 2011-207508

(51) Int. Cl.
*H04B 3/20* (2006.01)
*G10L 21/0208* (2013.01)

(52) U.S. Cl.
CPC ... *G10L 21/0208* (2013.01); *G10L 2021/02082* (2013.01)

(58) Field of Classification Search
CPC .......... H04M 9/08; H04M 9/082; H04B 3/20; H03G 3/00; H03G 3/14; H03G 3/301; H03G 3/3026; H03G 3/3036; H03G 3/3042; H03G 3/32; H03G 3/347; G01H 7/00; H04S 7/305; H04R 25/554
USPC ............... 381/61, 66, 26, 91, 92, 122, 98, 99, 381/100, 101, 102, 103, 104, 106, 107, 108, 381/120, 121, 71.1, 94.8, 94.2, 71.4, 71.7, 381/71.8, 71.9, 71.11–71.14, 94.3, 94.5, 381/94.7; 700/94; 704/E21.007, E21.002, 704/E19.014; 379/406.01, 406.12, 406.13, 379/406.14, 406.06
See application file for complete search history.

(56) References Cited

U.S. PATENT DOCUMENTS

| | | | | |
|---|---|---|---|---|
| 2003/0026437 | A1* | 2/2003 | Janse et al. | 381/71.4 |
| 2006/0115095 | A1* | 6/2006 | Giesbrecht et al. | 381/66 |
| 2008/0059157 | A1 | 3/2008 | Fukuda et al. | |

FOREIGN PATENT DOCUMENTS

| | | | |
|---|---|---|---|
| EP | 1 469 703 | A2 | 10/2004 |
| EP | 1 667 416 | A2 | 6/2006 |

(Continued)

OTHER PUBLICATIONS

James Eaton Et al, "Noise-Robust Reverberation Time Estimation using Spectral Decay Distributions with Reduced Computational Cost", Proc. IEEE Intl. Conf. on Acoustics, Speech and Signal Processing (ICASSP), Apr. 11, 2013, XP055072650, Vancouver Canada, 5 pages.

(Continued)

*Primary Examiner* — Leshui Zhang
(74) *Attorney, Agent, or Firm* — Staas & Halsey LLP

(57) ABSTRACT

A reverberation suppression device includes an analyzer configured to analyze change over time in the power of an input signal obtained from a microphone in response to sound input, and thereby compute the decrease per unit time in the power of the input signal in a reverb segment following the end of a segment in which the sound is produced; and a suppression controller configured to control a suppression gain which indicates the rate at which the input signal is attenuated, on the basis of analysis results from the analyzer.

15 Claims, 14 Drawing Sheets

(56) References Cited

FOREIGN PATENT DOCUMENTS

| | | | |
|---|---|---|---|
| JP | 2006-129434 | A | 5/2006 |
| JP | 2006-157920 | | 6/2006 |
| JP | 2008-58900 | | 3/2008 |
| JP | 2008-288718 | A | 11/2008 |
| JP | 2011-065128 | A | 3/2011 |
| WO | WO 2006/011104 | | 2/2006 |

OTHER PUBLICATIONS

Extended Search Report dated Aug. 2, 2013 in European Patent Application No. 12173939.5-1901/2573768.

Japanese Office Action dated Jan. 27, 2015 in corresponding Japanese Patent Application No. 2011-207508 (3 pages) (2 pages English Translation).

* cited by examiner

REVERBERATION SUPPRESSION DEVICE, REVERBERATION SUPPRESSION METHOD, AND COMPUTER-READABLE STORAGE MEDIUM STORING A REVERBERATION SUPPRESSION PROGRAM

CROSS-REFERENCE TO RELATED APPLICATION(S)

This application is based upon and claims the benefit of priority of the prior Japanese Patent Application No. 2011-207508, filed on Sep. 22, 2011, the entire contents of which are incorporated herein by reference.

FIELD

The embodiments discussed herein are related to a reverberation suppression device, a reverberation suppression method, and a reverberation suppression program configured to suppress reverb in sound input into a microphone provided in a device such as a mobile device.

BACKGROUND

When a mobile device is used indoors, sound emitted by the user not only reaches the microphone of the mobile device directly, but also reaches the microphone after reflecting off objects such as the surrounding walls and ceiling. In the following description, sound that reaches a microphone directly will be designated direct sound, while sound that reaches the microphone after reflecting off objects such as the surrounding walls and ceiling will be designated reverb. Also, a signal obtained by the microphone in response to the arrival of sound will be designated an input signal.

For example, in a comparatively small room such as a bathroom, reverb reflected off the surroundings is greater compared to another place such as a living room. For this reason, when the telephony functions of a mobile device are used in a room such as bathroom, it may be difficult in some cases to generate clear sound from the input signal obtained by the microphone because of the superposition of direct sound and reverb.

Japanese Laid-open Patent Publication No. 2008-58900 proposes a technology that suppresses reverb components included in an input signal obtained by a microphone, in which a reverb power spectrum estimated from the power spectra of past frames is subtracted from the power spectrum of the current frame. This technique attempts reverberation suppression by determining filter coefficients so as to minimize a weighted sum of the residual speech power in a reverb segment at the end of an utterance and the subtracted power in an utterance segment, which are estimated on the basis of change in the input signal over time.

SUMMARY

According to an aspect of the embodiment, a reverberation suppression device includes an analyzer configured to analyze change over time in the power of an input signal obtained from a microphone in response to sound input, and thereby compute the decrease per unit time in the power of the input signal in a reverb segment following the end of a segment in which the sound is produced; and a suppression controller configured to control a suppression gain which indicates the rate at which the input signal is attenuated, on the basis of analysis results from the analyzer.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

Hereinafter, embodiments of a reverberation suppression device, a reverberation suppression method, and a reverberation suppression program of the present disclosure will be described in detail on the basis of the drawings.

Figure 1:
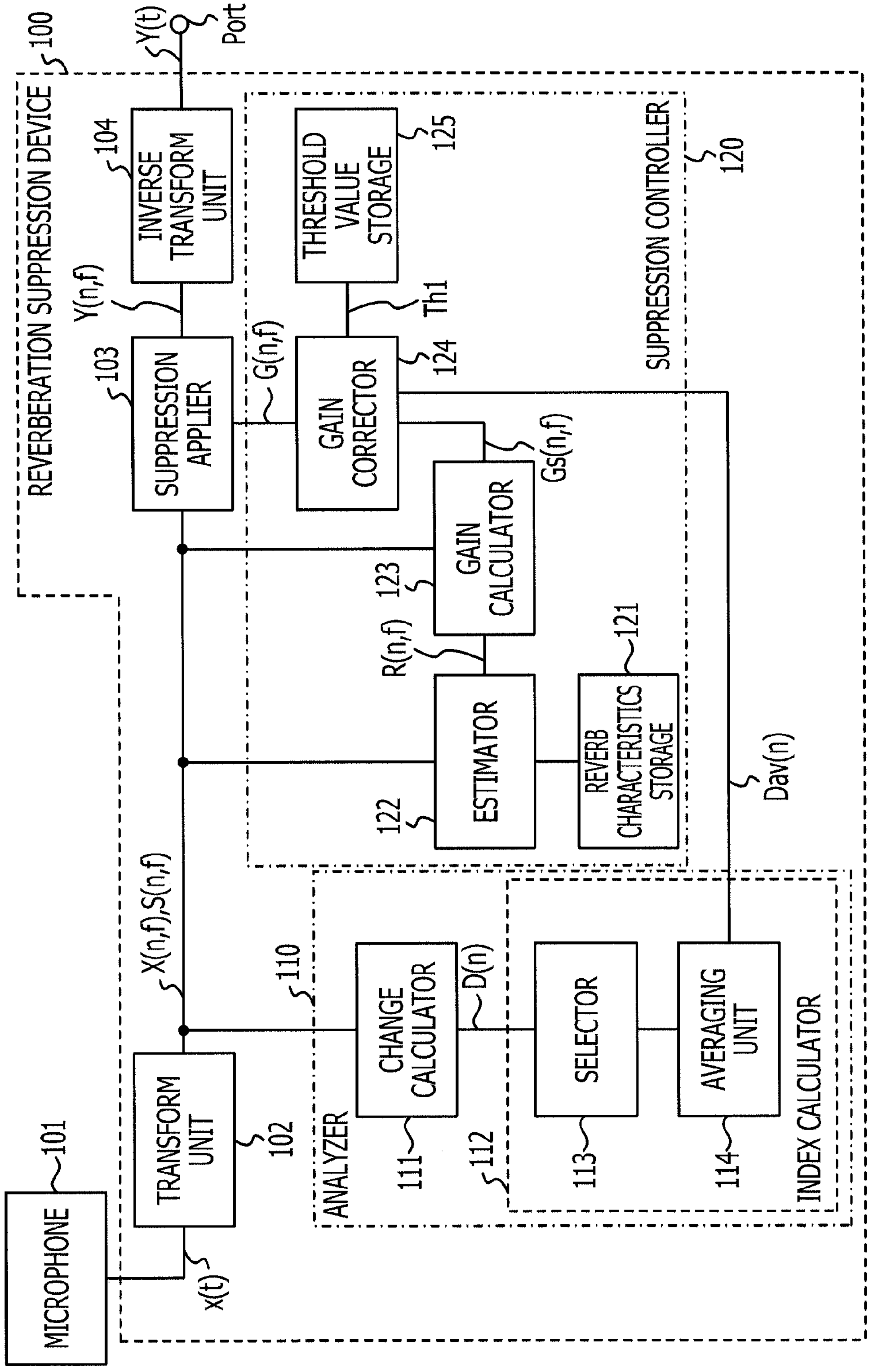
FIG. 1 is a diagram illustrating an embodiment of a reverberation suppression device.

FIG. 1 is a diagram illustrating an embodiment of a reverberation suppression device. The reverberation suppression device 100 illustrated by example in FIG. 1 may for example generate an output signal y(t) by suppressing a reverb component included in an input signal x(t) obtained by a microphone 101 mounted in a mobile device having telephony functions, such as a mobile phone. The output signal y(t) is output via an output terminal Port.

A reverberation suppression device 100 of the present disclosure may be applied to the reverberation suppression of input signals obtained by a microphone 101 mounted in various electronic devices, including personal digital assistants equipped with communication functions, telephone handsets, and portable videogame systems.

The reverberation suppression device 100 illustrated by example in FIG. 1 includes a transform unit 102, an analyzer 110, a suppression controller 120, a suppression applier 103, and an inverse transform unit 104. The transform unit 102 may for example apply a fast Fourier transform to each frame of an input signal x(t) to obtain an input signal spectrum X(n, f) corresponding to each input signal frame x(n, t). In addition, the transform unit 102 may also use the input signal spectra X(n, f) to compute input power spectra S(n, f) expressed using common logarithms as in Eq. 1. The input power spectra S(n, f) may then be input into the analyzer 110. Herein, a frame is the unit of analysis for the Fourier transform. Also, the symbol n represents the frame number, while the symbol f represents the frequency number.

$$S(n,f)=10\ \log_{10}|X(n,f)|^2 \quad (1)$$

The analyzer 110 analyzes characteristics of the change over time of an input signal x(t) in a reverb segment following the end of a segment in which sound is produced, on the basis of the input signal spectrum X(n, f) or the input power spectrum S(n, f) for each frame, as discussed later. On the basis of analysis results from the analyzer 110, the suppression controller 120 controls a suppression gain G(n, f) which expresses the attenuation rate applied to the input signal spectra X(n, f) by the suppression applier 103 in order to suppress the reverb component included in the input signal spectra X(n, f). Additionally, by applying such suppression gain G(n, f) to the input signal spectra X(n, f), the suppression applier 103 generates output signal spectra Y(n, f) in which the reverb component has been appropriately suppressed. The inverse transform unit 104 generates the output signal y(t) by, for example, applying an inverse Fourier transform to the output signal spectra Y(n, f) generated by the suppression applier 103.

Next, a technique by which the analyzer 110 analyzes characteristics of change over time in the reverb segment of an input signal x(t) will be described.

Figure 2A:
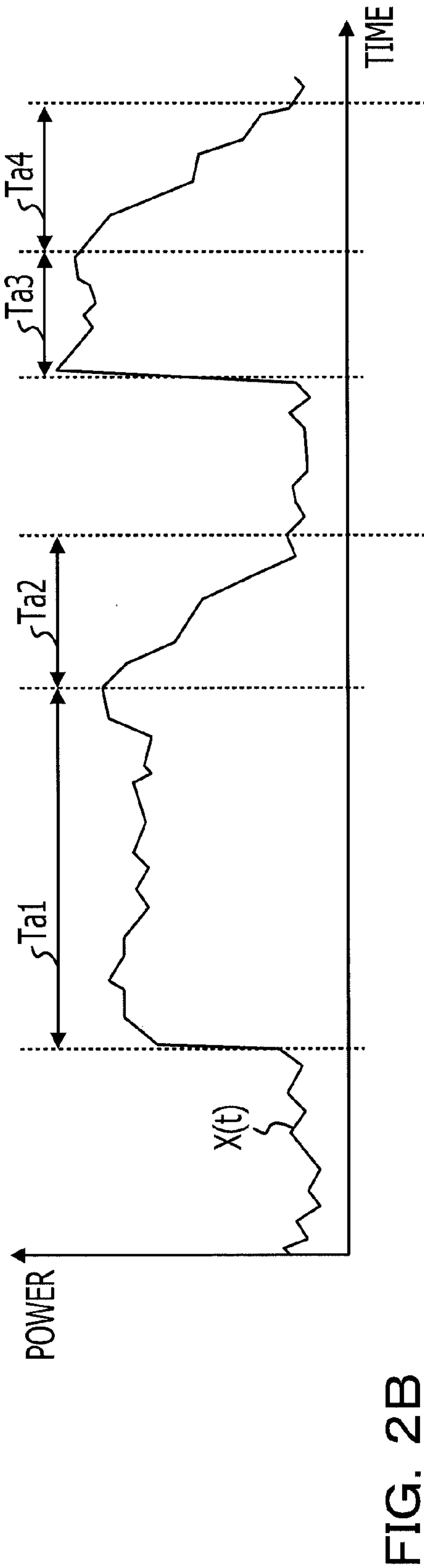
FIGS. 2A and 2B are diagrams illustrating exemplary change in input signal power over time.
Figure 2B:
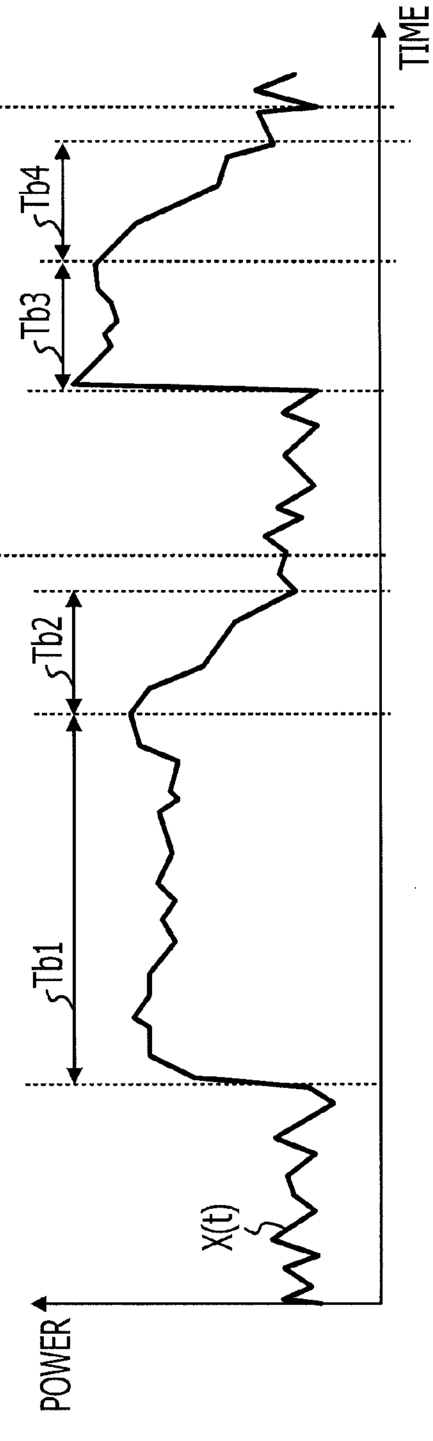

FIGS. 2A and 2B are diagrams illustrating exemplary change in an input signal x(t) over time. The input signals x(t) respectively illustrated in FIGS. 2A and 2B are both obtained in the same room, but with different magnitudes of background noise. In this example, the average background noise level when obtaining the input signal x(t) illustrated in FIG. 2B is greater than the average background noise level when obtaining the input signal x(t) illustrated in FIG. 2A.

The segments labeled Ta1 and Ta3 in FIG. 2A as well as the segments labeled Tb1 and Tb3 in FIG. 2B are segments in which sound is produced. In contrast, the segments labeled Ta2 and Ta4 in FIG. 2A as well as the segments labeled Tb2 and Tb4 in FIG. 2B are reverb segments following segments in which sound is produced.

Compared to the reverb segments Ta2 and Ta4 appearing in the input signal x(t) illustrated in FIG. 2A, the reverb segments Tb2 and Tb4 appearing in the input signal x(t) illustrated in FIG. 2B are shorter due to the reverb component becoming filled with background noise at an earlier stage.

However, the decrease per unit time of the input signal x(t) in the reverb segments Ta2 and Ta4 illustrated in FIG. 2A is nearly equal to the decrease per unit time of the input signal x(t) in the reverb segments Tb2 and Tb4 illustrated in FIG. 2B.

This is because the reverb component is correlated with the preceding input sound and attenuates according to the reverb characteristics of the room, and thus the decrease per unit time of an input signal x(t) in a reverb segment represents the attenuation rate of the reverb component according to the reverb characteristics. In other words, in the regions not filled with background noise, it is possible to ascertain the attenuation rate of the reverb component according to the reverb characteristics, on the basis of the decrease per unit time in a reverb segment of the input signal x(t).

Consequently, by causing the analyzer 110 illustrated by example in FIG. 1 to compute the decrease per unit time of an input signal x(t) in a reverb segment, it is possible to ascertain how readily the reverb component attenuates in the environment where the microphone 101 is placed, regardless of the magnitude of background noise.

For example, a small decrease per unit time of the input signal x(t) in a reverb segment indicates that attenuation of the reverb component is slow in the environment where the microphone 101 is placed. In contrast, a large decrease per unit time of the input signal x(t) in a reverb segment indicates that the reverb component rapidly attenuates in the environment where the microphone 101 is placed. In this way, the decrease per unit time of the input signal x(t) in a reverb segment obtained as analysis results by the analyzer 110 indicates the attenuation rate of the reverb component in the environment where the microphone 101 is placed.

Consequently, by causing the suppression controller 120 illustrated by example in FIG. 1 to control the suppression gain G(n, f) on the basis of such analysis results, it is possible to realize reverberation suppression that applies a suppression gain G(n, f) suited to the environment in which the microphone 101 is placed.

The suppression controller 120 may also apply control so as to reduce the suppression gain G(n, f) applied to the input signal spectra X(n, f) in the case where analysis results obtained by the analyzer 110 indicate a large decrease per unit time of an input signal x(t) in a reverb segment, for example. By having the suppression controller 120 apply such control, it is possible to mitigate over-suppression of an input signal x(t) obtained by a microphone 101 placed in an environment where the reverb component attenuates rapidly.

Figure 3:
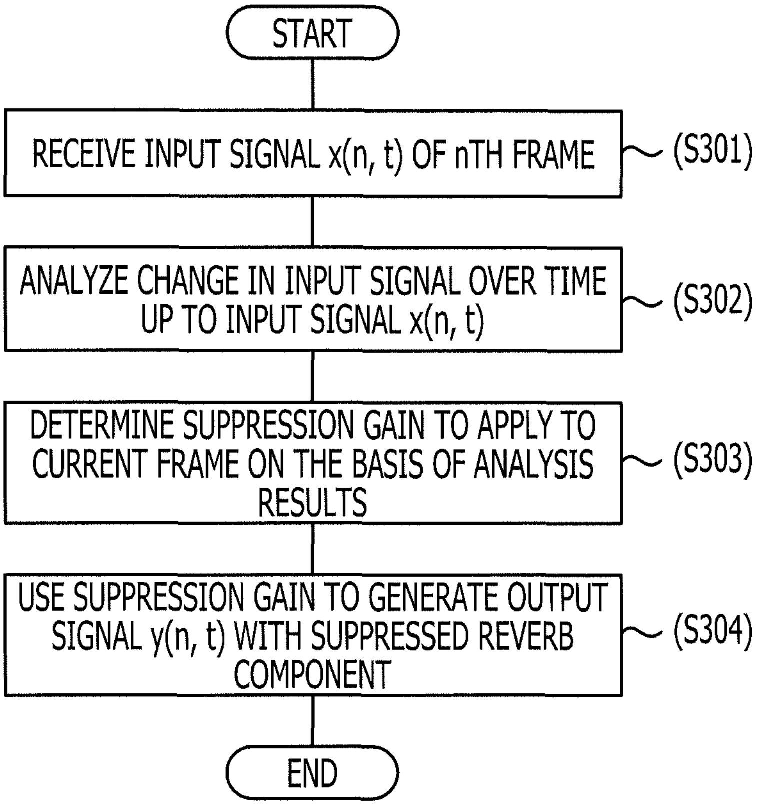
FIG. 3 is a flowchart of a reverberation suppression process.

FIG. 3 is an exemplary flowchart of a reverberation suppression process conducted by the reverberation suppression device 100 illustrated by example in FIG. 1. Steps S301 to S304 illustrated by example in FIG. 3 are processing operations executed by the reverberation suppression device 100 in response to the input of an nth frame input signal x(n, t) obtained by sampling an input signal x(t).

In step S301, the analyzer 110 illustrated by example in FIG. 1 receives, via the transform unit 102, an input signal spectrum X(n, f) or an input power spectrum S(n, f) corresponding to the nth frame input signal x(n, t). Hereinafter, the case of the analyzer 110 using input power spectra S(n, f) to analyze change in the input signal x(t) over time will be described.

Subsequently, the analyzer 110 analyzes change in the input signal x(t) over time on the basis of the respective input power spectra S(j, f) (where j=1 to n) of the frames received thus far (step S302). In step S302, the analyzer 110 may also compute an index indicating the decrease per unit time in a reverb segment of the input signal x(t). The analyzer 110 may then output the computed index as an analysis result. Furthermore, the analyzer 110 may also extract characteristics of change over time in the input signal x(t) in a reverb segment on the basis of change over time in the input signal x(j, t) (where j=1 to n) itself up to the nth frame.

On the basis of the analysis result obtained by the processing in step S302, the suppression controller 120 illustrated by example in FIG. 1 determines a suppression gain G(n, f) to apply to the input signal spectrum X(n, f) of the current frame (step S303). The suppression controller 120 may for example compute a suppression gain G(n, f) by correcting a standard suppression gain according to the decrease per unit time of the input signal x(t) in a reverb segment as indicated by the analysis result from the analyzer 110.

Subsequently, the suppression applier 103 and the inverse transform unit 104 illustrated by example in FIG. 1 use the suppression gain G(n, f) computed as above to generate an output signal y(n, t) in which the reverb component included in the nth frame input signal x(n, t) has been suppressed (step S304). The suppression applier 103 may also generate an output signal spectrum Y(n, f) in which the reverb component has been suppressed by applying the suppression gain G(n, f) to the nth frame input signal spectrum X(n, f), for example. Additionally, an output signal y(n, t) in the time domain may also be generated by having the inverse transform unit 104 apply an inverse fast Fourier transform to the output signal spectrum Y(n, f).

As discussed above, analysis results from the analyzer 110 indicate how readily the reverb component attenuates in an indoor environment, regardless of the magnitude of background noise. The suppression gain G(n, f) determined for each frame by the suppression controller 120 on the basis of such analysis results becomes a suitable value for suppressing the reverb component included an input signal x(t), regardless of the magnitude of background noise.

Consequently, by executing the processing in the above steps S301 to S304 on individual frame input signals x(n, t), it is possible to obtain an output signal y(t) in which just the reverb component has been accurately suppressed, regardless of the magnitude of background noise. Since the components expressing sound included in the input signal x(t) are faithfully reproduced in an output signal y(t) obtained in this way, reproduction of the original sound with low distortion is possible on the basis of the output signal y(t).

Next, the analyzer 110 illustrated by example in FIG. 1 will be further described. The analyzer 110 illustrated by example in FIG. 1 includes a change calculator 111 and an index calculator 112. Also, the index calculator 112 illustrated by example in FIG. 1 includes a selector 113 and an averaging unit 114.

The change calculator 111 calculates a change D(n) on the basis of the difference between the input power spectrum S(n, f) of the nth frame and the input power spectrum S(n−1, f) of the (n−1)th frame received from the transform unit 102.

The change calculator 111 may also calculate the change D(n) as a sum of differences between the input power spectrum S(n, f) of the nth frame and the input power spectrum S(n−1, f) of the (n−1)th frame for respective frequency numbers, as in Eq. 2, for example.

$$D(n) = \sum_{f} (S(n, f) - S(n-1, f)) \tag{2}$$

Figure 4:
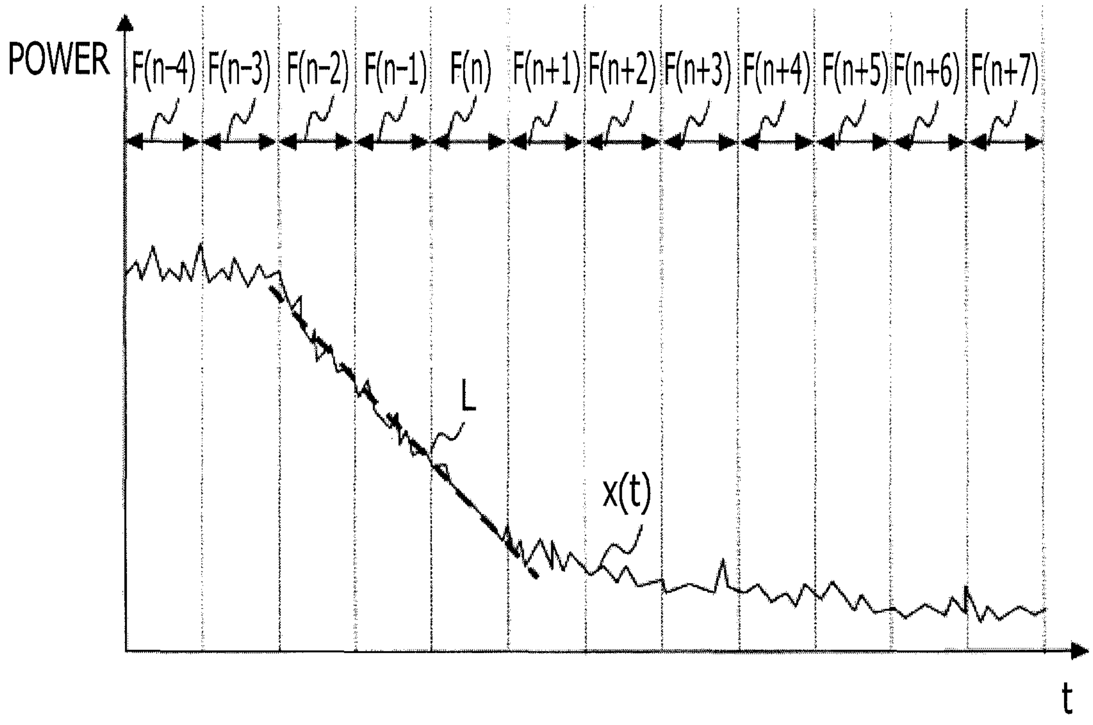
FIG. 4 is a diagram explaining an exemplary process of analyzing change in an input signal over time.

FIG. 4 is a diagram explaining an exemplary process of analyzing change in an input signal x(t) over time. In FIG. 4, individual frames taken as the units of analysis for the Fourier transform by the transform unit 102 are indicated by combinations of a symbol F and frame numbers. In other words, in FIG. 4, the segments labeled F(n−4) to F(n+7) respectively indicate the (n−4)th to (n+7)th frames.

In the exemplary input signal x(t) illustrated in FIG. 4, the segment from the (n−2)th to (n+1)th frames is a reverb segment corresponding to sound produced in a segment ending with the (n−3)th frame. In correspondence with the input signals x(j, t) (where j=n−2 to n+1) for the frames included in the reverb segment, the change calculator 111 uses the above Eq. 1 to compute input power spectra S(j, f), which monotonically decrease in correlation with the attenuation of the input signals x(j, t).

Consequently, the change D(j) (where j=n−2 to n+1) computed using the above Eq. 2 for each frame included in this segment become values that reflect the attenuation rate of the input signal x(t) over time. In other words, the change calculator 111 is able to compute values for the change D(j) (where j=n−2 to n+1) that reflect the slope of a line L approximating the change in the input signal x(t) in the segment from the (n−2)th to the (n+1)th frames illustrated in FIG. 4. Additionally, by computing the average of the change D(j) (where j=n−2 to n+1) obtained for each frame, it is possible to compute an index which indicates the attenuation rate of the input signal x(t) in this segment.

Furthermore, the change calculator 111 may also apply weights so as to suppress the effects of the background noise component included in the input signal x(t) when computing a change D(n). By suppressing such a background noise component, the change calculator 111 is able to compute a change D(n) that more faithfully reflects the slope of the change in the input signal x(t) over time in the nth frame.

The changes D(n) computed in this way are passed to the averaging unit 114 via the selector 113 illustrated by example in FIG. 1. The averaging unit 114 then conducts an averaging process discussed later on the changes D(n) received via the selector 113 to compute an average change Dav(n).

Herein, a reverb segment is a segment in which the input signal x(t) attenuates in response to the end of an utterance produced indoors. Consequently, among the changes D(n) obtained by the change calculator 111, changes D(n) with negative values reflect the attenuation rate of the input signal x(t) in the reverb segment.

In other words, by having the selector 113 selectively pass the changes D(n) with negative values to the averaging unit 114, it is possible to make the averaging unit 114 compute an average change Dav(n) that indicates the decrease per unit time of the input signal x(t) in the reverb segment.

The selector 113 may, for example, selectively pass to the averaging unit 114 changes D(n) included in a range expressed by given constants d1 and d2, both of which are negative values. Also, the averaging unit 114 may compute an average change Dav for the nth frame by performing a weighted sum of the change D(n) for the nth frame and the average change Dav(n−1) for previous frames up to the (n−1)th frame, with the applied weights being expressed using a given coefficient α. Such an average change Dav(n) computed by the averaging unit 114 may be expressed as in Eq. 3.

$$\left.\begin{array}{ll} Dav(n) = \alpha \cdot Dav(n-1) + (1-\alpha) \cdot D(n) & d1 \le D(n) \le d2 \\ Dav(n) = Dav(n-1) & D(n) < d1,\ D(n) > d2 \end{array}\right\} \tag{3}$$

Herein, the value of the constant d2 may be determined on the basis of the attenuation rate of an input signal x(t) in an environment where the reverb component is anticipated to be most resistant to attenuation, for example. Also, by using the constant d1 to restrict the minimum value of the change D(n) to be used for computing an average change Dav(n), it is possible to mitigate the effects of sudden noise, for example. Furthermore, the value of the coefficient α may be set such that the value of the change D(n) and the average change Dav(n−1) for previous frames up to the (n−1)th frame are reflected in the value of the average change Dav(n) in respectively suitable ratios.

The average change Dav(n) computed in this way reflects the attenuation rate of the reverb component in the environment where the input signal x(t) was obtained. Consequently, it is possible to use the average change Dav(n) as a basis for determining the desirability of applying a reverberation suppression process to an input signal x(t) in the environment where the microphone 101 is placed.

Figure 5:
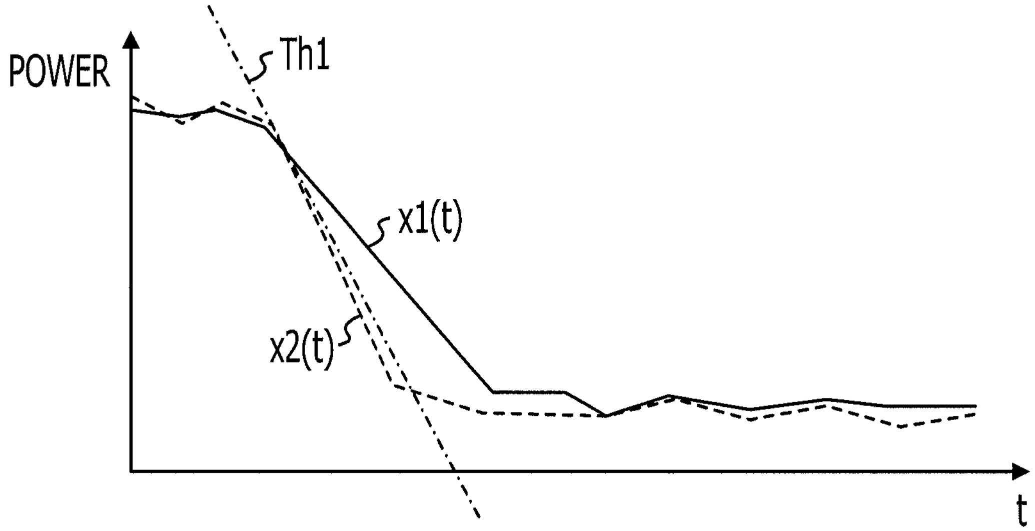
FIG. 5 is a diagram explaining environment-induced differences in the decrease per unit time of an input signal in a reverb segment.

FIG. 5 is a diagram explaining environment-induced differences in the decrease per unit time of an input signal x(t) in a reverb segment. In FIG. 5, the graph illustrated by a solid line is an example of change in an input signal x1(*t*) over time in a room with comparatively high reverb, such as a bathroom. Also, in FIG. 5, the graph illustrated by a broken line is an example of change in an input signal x2(*t*) over time in a room with comparatively low reverb, such as a living room.

Comparing the input signal x1(*t*) and the input signal x2(*t*) illustrated in FIG. 5, there is a clear difference between the decrease per unit time in the reverb segment of the input signal x1(*t*) acquired in a room with high reverb, and the decrease per unit time in the reverb segment of the input signal x2(*t*) acquired in a room with low reverb. Additionally, it may considered that a reverberation suppression process may be omitted for the input signal x2(*t*) but is desirable for the input signal x1(*t*), and if so, the question of whether or not to conduct a reverberation suppression process may be determined with a threshold value placed intermediately between the decreases per unit time in the reverb segment for both input signals.

If a first threshold Th1 indicating such a threshold value is determined in advance, the first threshold Th1 may be used in the process of controlling suppression gain conducted by the suppression controller 120 illustrated by example in FIG. 1.

The above first threshold Th1 may also be determined on the basis of the decrease per unit time in the reverb segment of an input signal x(t) such that the reverberation suppression process is not applied to signals such as the input signal x2(*t*) illustrated by example in FIG. 5. The first threshold Th1 may also be set as the slope of a line that attenuates at a rate intermediate between the attenuation rate of the input signal x1(*t*) and the attenuation rate of the input signal x2(*t*) in their respective reverb segments. For example, the first threshold Th1 may be set to express a decrease per unit time that is slightly less than the decrease per unit time in the reverb segment of an input signal x(t) acquired in an environment where the effects of reverb are small, such as a living room. Note that the line labeled Th1 in FIG. 5 is a line having the first threshold Th1 as its slope.

Next, the suppression controller 120 illustrated by example in FIG. 1 will be further described. The suppression controller 120 illustrated by example in FIG. 1 includes reverb characteristics storage 121, an estimator 122, a gain calculator 123, a gain corrector 124, and threshold value storage 125.

The threshold value storage 125 illustrated by example in FIG. 1 stores a first threshold Th1 that has been predetermined as discussed above. The reverb characteristics storage 121 stores reverb characteristics γ(f) that have been specified in advance such as by measuring an indoor area targeted for reverberation suppression by the reverberation suppression device 100. The reverb characteristics γ(f) may be, for example, a function expressing the relationship between a reverb component spectrum Xr(f) and an input signal spectrum X(f). Hereinafter, a method of specifying reverb characteristics γ(f) will be summarized.

Figure 6:
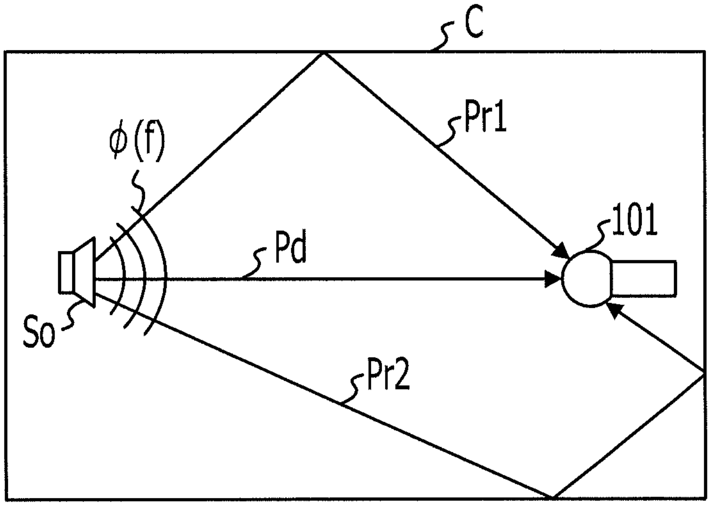
FIG. 6 is a diagram explaining reverb characteristics.

FIG. 6 is a diagram explaining reverb characteristics γ(f). In FIG. 6, besides a path Pd that reaches the microphone 101 directly, there are other paths such as the paths labeled Pr1 and Pr2, which reach the microphone after reflecting off the walls and ceiling of a room C. Note that the paths Pr1 and Pr2 are examples of paths that reach the microphone 101 after reflection.

Consequently, an input signal spectrum X(f) corresponding to an input signal x(t) observed by the microphone 101 in response to sound produced by a sound source may be expressed as the sum of a direct sound component spectrum Xd(f) and a reverb component spectrum Xr(f), as in Eq. 4.

$$X(f)=Xd(f)+Xr(f) \tag{4}$$

The direct sound component spectrum Xd(f) may be expressed using a sound spectrum φ(f) that corresponds to sound produced by a sound source So, and the transfer characteristics Hd(f) of the path Pd that reaches the microphone 101 directly from the sound source So, as in Eq. 5. Similarly, the reverb component spectrum Xr(f) may be expressed using the sound spectrum φ(f) and the transfer characteristics Hr(f) of paths that reach the microphone 101 via reflection off the walls and ceiling of the room C, as in Eq. 6.

$$Xd(f)=Hd(f)\cdot\phi(f) \tag{5}$$

$$Xr(f)=Hr(f)\cdot\Phi(f) \tag{6}$$

Eqs. 4 to 6 may be transformed to obtain Eq. 7, which expresses the relationship between the reverb component spectrum Xr(f) and the input signal spectrum X(f).

$$\begin{aligned} X_r(f) &= \frac{H_r(f)}{H_d(f)+H_r(f)}X(f) \\ &= \frac{H_r(f)}{H(f)}X(f) \\ &= \gamma(f)\cdot X(f) \end{aligned} \tag{7}$$

In other words, the reverb characteristics γ(f) may be obtained as the ratio of the transfer characteristics Hr(f) regarding the transfer of reverb versus the overall transfer characteristics H(f) regarding the transfer of all paths reaching the microphone 101 from the sound source So. Reverb characteristics γ(f) thus obtained may then be stored in the reverb characteristics storage 121. Note that the transfer characteristics H(f) and the transfer characteristics Hr(f) may be computed with established techniques, such as by measuring impulse response in a given indoor area where the application of reverberation suppression is desirable, such as a bathroom, for example. For a specific technique of computing reverb characteristics γ(f), see "Reverberation suppression device, reverberation suppression method, and reverberation suppression program", Japanese Patent Application No. 2011-165274, previously submitted by the Inventors.

The estimator 122 uses reverb characteristics γ(f) stored in the reverb characteristics storage 121 to estimate a reverb power spectrum R(n, f) expressing the reverb component included in the input signal spectrum X(n, f) of the nth (i.e., current) frame.

The estimator 122 may also compute a reverb power spectrum R(n, f) as the convolution of the reverb characteristics γ(f) and the input power spectra S(n−d, f) (where d=1 to M) of the last M frames preceding the current frame, as illustrated in Eq. 8, for example.

$$R(n,f)=\sum_d(\gamma(d,f)\cdot S(n-d,f)) \tag{8}$$

On the basis of a reverb power spectrum R(n, f) obtained by the estimator 122, the gain calculator 123 illustrated by example in FIG. 1 computes a standard suppression gain in the form of a standard suppression gain Gs(n, f) that expresses a gain for removing the reverb power spectrum R(n, f). The gain calculator 123 may also, for example, compute a standard suppression gain Gs(n, f) that monotonically decreases in response to increases in the signal-to-reverb ratio SRR, which expresses the difference between the input power spectrum S(n, f) and the estimated reverb power spectrum R(n, f) of the nth frame.

Figure 7:
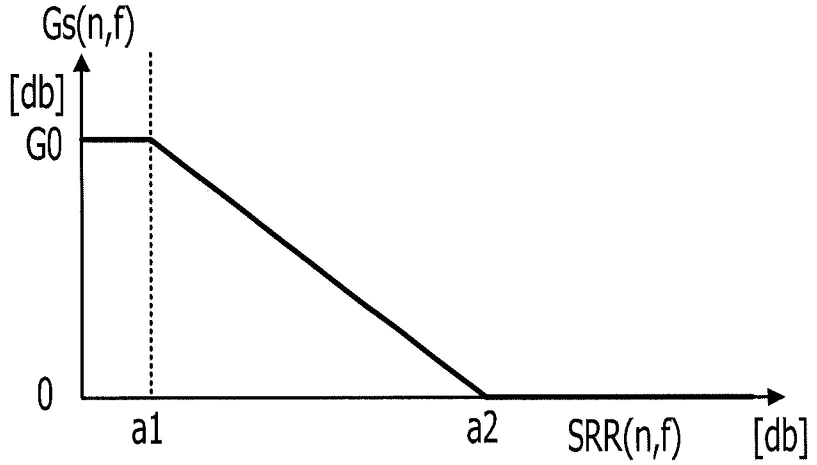
FIG. 7 is a diagram explaining an exemplary process of computing standard suppression gain.

FIG. 7 is a diagram explaining an exemplary process of computing standard suppression gain Gs(n, f). In FIG. 7, the horizontal axis represents the signal-to-reverb ratio SRR, while the vertical axis represents values for the standard suppression gain Gs(n, f).

The gain calculator 123 may use a function like that illustrated by the bold line in FIG. 7 to compute a standard suppression gain Gs(n, f) that corresponds to the signal-to-reverb ratio SRR(n, f) for the frequency number f in the nth frame. When using such a function, the gain calculator 123 outputs a preset upper-limit value G0 dB as the standard suppression gain Gs(n, f) in the case where the signal-to-reverb ratio SRR(n, f) is less than a given value a1. In contrast, the gain calculator 123 outputs a given value of 0 dB as the standard suppression gain Gs(n, f) in the case where the signal-to-reverb ratio SRR(n, f) is greater than a given value a2. In cases where the signal-to-reverb ratio SRR(n, f) is included in a range expressed by the above values a1 and a2, the gain calculator 123 outputs a value that monotonically decreases in accordance with the value of the signal-to-reverb ratio SRR(n, f) as the standard suppression gain Gs(n, f). Herein, the above value a1 may be determined on the basis of the background noise level, for example. Also, the value a2 may be determined on the basis of the signal-to-reverb ratio SRR (n, f) in a segment where sound is being produced, for example.

The gain corrector 124 computes a suppression gain G(n, f) by applying a correction based on analysis results obtained by the analyzer 110 discussed earlier to a standard suppression gain Gs(n, f) computed by the gain calculator 123 as above.

The gain corrector 124 may also use Eq. 9 to compute a suppression gain G(n, f) on the basis of an average change Dav(n) obtained as an index indicating the decrease per unit time in a reverb segment of an input signal x(t) according to analysis by the analyzer 110, for example. According to Eq. 9, the gain corrector 124 takes the suppression gain G(n, f) to be the standard suppression gain Gs(n, f) in the case where the value of the average change Dav(n) is greater than the first threshold Th1 discussed earlier. In contrast, the gain corrector 124 takes the suppression gain G(n, f) to be a given value of 0 dB in the case where the value of the average change Dav(n) is not greater than the first threshold Th1 discussed earlier.

$$G(n,f)=\begin{cases} Gs(n,f) & \text{if } (Dav(n) > Th1) \\ 0\text{ dB} & \text{else} \end{cases} \tag{9}$$

Herein, a value of the average change Dav(n) that is greater than the first threshold Th1 discussed earlier indicates that the attenuation rate of the input signal x(t) in the reverb segment is less than the rate corresponding to the first threshold Th1, similarly to the input signal x1(*t*) illustrated by example in FIG. 5. In contrast, a value of the average change Dav(n) that is less than the first threshold Th1 discussed earlier indicates that the input signal x(t) attenuates in the reverb segment at a greater rate than the rate corresponding to the first threshold Th1, similarly to the input signal x2(*t*) illustrated by example in FIG. 5.

In other words, on the basis of a comparison between the value of the average change Dav(n) and the first threshold Th1 discussed earlier, the gain corrector 124 is able to determine whether or not the reverb component readily attenuates in the environment where the input signal x(t) was acquired, or in other words, whether or not reverberation suppression is desirable.

As a result of the gain corrector 124 applying such gain correction, the suppression gain G(n, f) may be set to a given value of 0 dB in the case where the input signal x(t) attenuates sharply in the reverb segment, regardless of the value of the standard suppression gain Gs(n, f). In other words, in the case where the input signal x(t) attenuates at a rate approximately equal to that of an environment where the reverb component attenuates readily, the gain corrector 124 sets the suppression gain G(n, f) to a given value of 0 dB, and is thereby able to stop reverberation suppression of the input signal x(t). In contrast, in the case where reverberation suppression is determined to be desirable on the basis of a comparison between the value of the average change Dav(n) and the first threshold Th1 discussed earlier, the suppression gain G(n, f) corrected by the gain corrector 124 becomes a standard suppression gain Gs(n, f) computed on the basis of the reverb characteristics γ(f). However, the gain corrector 124 may also compute the suppression gain G(n, f) by subtracting a correction value depending on the value of the average change Dav(n) from the standard suppression gain Gs(n, f) in the case where the value of the average change Dav(n) is greater than the first threshold Th1 discussed earlier. For example, the gain corrector 124 may determine the above correction value such that the correction value decreases as the value of the average change Dav(n) approaches the decrease per unit time exhibited by the input signal x(t) in the reverb segment in an environment imparting reverb characteristics γ(f).

In this way, by causing the gain corrector 124 to compute a suppression gain G(n, f) according to analysis results from the analyzer 110, it is possible to realize control of the suppression gain G(n, f) according to the environment in which the microphone 101 illustrated in FIG. 1 is placed. Consequently, it is possible to use a standard suppression gain Gs(n, f), which is computed on the basis of reverb characteristics γ(f) specified for an environment where reverb does not attenuate readily, as a basis for suppression gain as discussed above, regardless of the environment where the microphone 101 is placed.

The suppression applier 103 uses a suppression gain G(n, f) computed in this way to execute a process that computes an output signal spectrum Y(n, f) in which the reverb component has been suppressed.

The suppression applier 103 may also, for example, compute a corrected power spectrum S'(n, f) corresponding to the output signal spectrum Y(n, f) by applying the suppression gain G(n, f) to the input power spectrum S(n, f) of the nth frame, as expressed in Eq. 10. Furthermore, the output signal spectrum Y(n, f) may also be computed by utilizing the corrected power spectrum S'(n, f) expressed in terms of the output signal spectrum Y(n, f) as in Eq. 11.

$$S'(n,f)=S(n,f)-G(n,f) \tag{10}$$

$$S'(n,f)=10\log_{10}|Y(n,f)|^2 \tag{11}$$

An output signal y(t) may be generated by having the inverse transform unit 104 apply an inverse fast Fourier transform to the output signal spectra Y(n, f) computed for respective frames in this way.

As discussed above, according to the reverberation suppression device 100 illustrated by example in FIG. 1, it is possible to apply reverberation suppression using a suitable suppression gain G(n, f) on the basis of the characteristics of change over time in an input signal x(t) in a reverb segment, regardless of the magnitude of background noise. In other words, according to a reverberation suppression device of the present disclosure, it is possible to accurately suppress just the reverb component without distorting the sound, regardless of the magnitude of the noise component.

In addition, the suppression controller 120 illustrated by example in FIG. 1 computes a suppression gain G(n, f) for each frame that reflects the results of analysis of the input signal x(n, t) for that frame by the analyzer 110. Consequently, if there is a change in the analysis results from the analyzer 110 due to a change in the environment where the input signal x(t) is acquired, that change is reflected in the suppression gain G(n, f) computed by the suppression controller 120. For example, in cases such as where the environment where the microphone 101 acquires the input signal x(t) changes from an environment with many reflections from the surroundings, such as a bathroom, to an environment with few reflections, such as a living room, that change may be reflected in the suppression gain G(n, f). Consequently, in cases such as when moving from a living room to a bathroom, it is also possible to apply a standard suppression gain Gs(f) computed on the basis of reverb characteristics γ(f) to subsequent input signals x(t) in response to the change in the analysis results for the input signal x(t) in the reverb segment. Thus, if the user of a mobile device equipped with a reverberation suppression device 100 of the present disclosure has moved to or is currently in a bathroom, for example, it becomes possible for the user to conceal that fact from the person with whom he or she is communicating.

A reverberation suppression device 100 of the present disclosure may be realized using mobile device hardware, for example.

Figure 8:
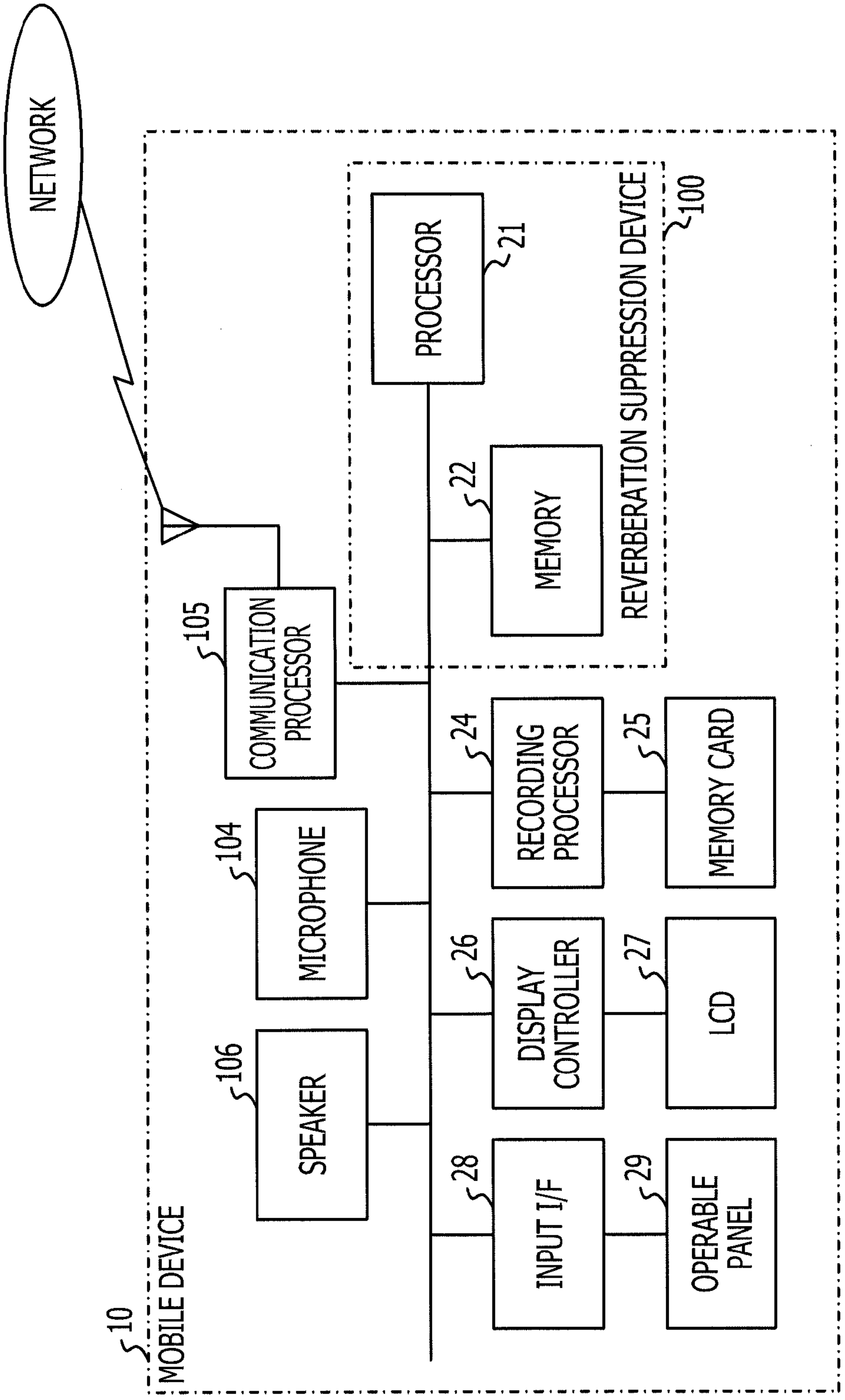
FIG. 8 is a diagram illustrating an exemplary hardware configuration of a mobile device.

FIG. 8 illustrates an exemplary hardware configuration of a mobile device 10. Herein, like reference signs are given to components illustrated in FIG. 8 that are equivalent to components illustrated in FIG. 1.

The mobile device 10 includes a processor 21, memory 22, a microphone 101, a communication processor 105, and a speaker 106. The mobile device 10 additionally includes a recording processor 24, a removable memory card 25, a display controller 26, a liquid crystal display (LCD) 27, an input interface (I/F) 28, and an operable panel 29. In the mobile device 10 illustrated in FIG. 8 herein, the reverberation suppression device 100 includes the processor 21 and the memory 22.

The processor 21, memory 22, communication processor 105, microphone 101, speaker 106, recording processor 24, display controller 26, and input I/F 28 are connected to each other via a bus. The recording processor 24 reads data from and writes data to the memory card 25. The display controller 26 controls display processing by the LCD 27. The input I/F 28 relays information representing operations made on the operable panel 29 to the processor 21.

The memory 22 stores the operating system of the mobile device 10, as well as an application program by which the processor 21 executes the reverberation suppression process discussed earlier. The application program includes programs for executing the processing that analyzes change in an input signal over time and the processing that corrects an input signal, which are included in a reverberation suppression method of the present disclosure. The application program for executing the above reverberation suppression process may be distributed by being recorded on the memory card 25, for example. By loading such a memory card into the recording processor 24 and reading out data therefrom, the application program for executing the reverberation suppression process is stored in the memory 22. Additionally, it is also possible to load an application program for executing the reverberation suppression process into the memory 22 via the communication processor 105 and a network such as the Internet.

Also, the reverb characteristics storage 121 illustrated by example in FIG. 1 may be realized by storing information indicating the reverb characteristics γ(f) discussed earlier in the memory 22, in addition to the above application program and other information. For example, the memory 22 may also be made to store information expressing reverb characteristics γ(f) computed on the basis of impulse response measured in a typical bathroom using the technique in Japanese Patent Application No. 2011-165274 previously submitted by the Inventors. Also, the threshold value storage 125 illustrated by example in FIG. 1 may be realized by storing information indicating the first threshold Th1 discussed earlier in the memory 22.

Also, the processor 21 may fulfill the function of the analyzer 110 illustrated in FIG. 1 by executing the program that analyzes change in an input signal over time, which is included in the application program stored in the memory 22. The processor 21 may also fulfill the functions of the suppression controller 120 and the suppression applier 103 illustrated in FIG. 1 by executing the program that corrects an input signal, which is included in the application program stored in the memory 22. Additionally, the application program stored in the memory 22 may also include programs by which the processor 21 executes a faster Fourier transform and an inverse fast Fourier transform. The processor 21 may also fulfill the respective functions of the transform unit 102 and the inverse transform unit 104 by executing such programs. In this way, the processor 21 is able to realize the respective functions included in the reverberation suppression device 100 illustrated in FIG. 1 by executing an application program stored in the memory 22.

Figure 9:
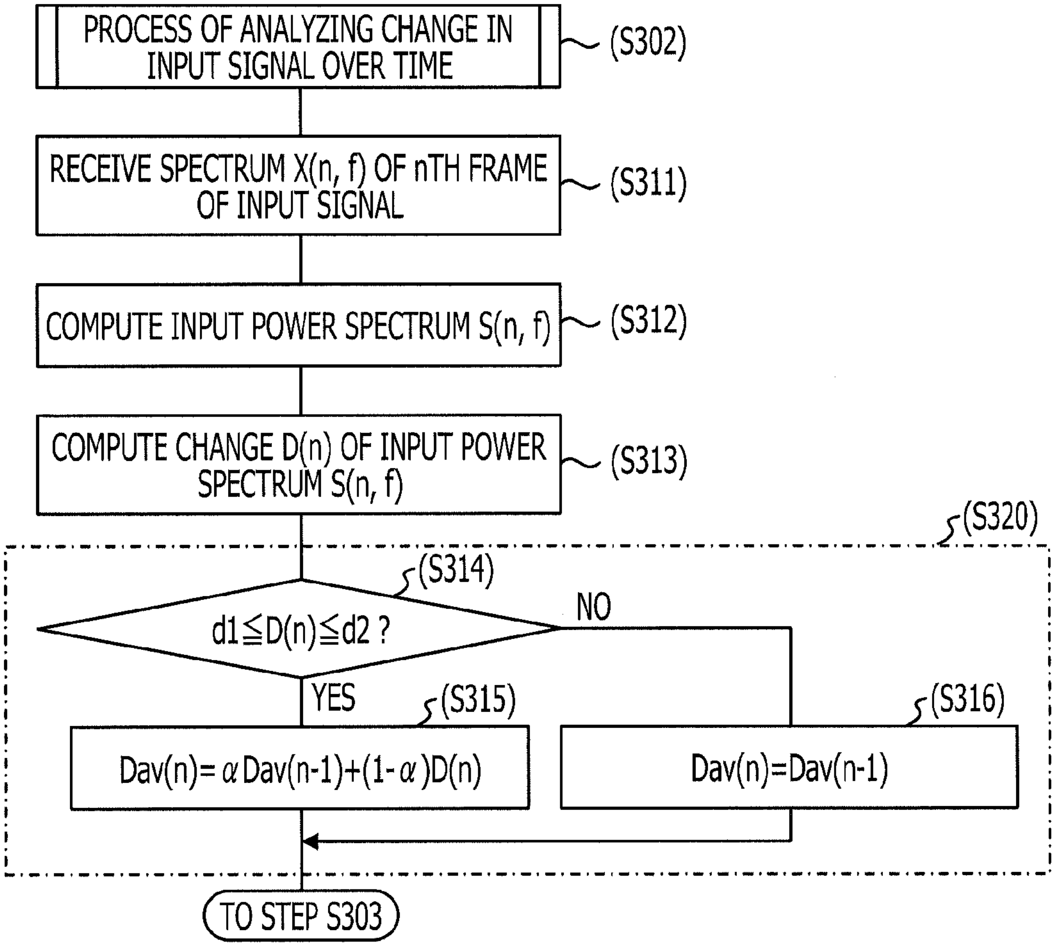
FIG. 9 is a flowchart of an exemplary process of analyzing change in an input signal over time.

FIG. 9 is a flowchart of an exemplary process of analyzing change in an input signal over time. The processing in steps S311 to S316 illustrated in FIG. 9 is an example of the processing in step S302 illustrated in FIG. 3. The processor 21 illustrated in FIG. 8 fulfills the function of the analyzer 110 by executing the processing in steps S311 to S316 included in the flowchart illustrated in FIG. 9 in cooperation with respective components.

First, in step S311 the processor 21 receives an input signal spectrum X(n, f) obtained by applying a fast Fourier transform to the input signal x(n, t) of the nth frame. Subsequently, the processor 21 uses the above Eq. 1 to compute the input power spectrum S(n, f) of the input signal spectrum X(n, f) (step S312).

Next, the processor 21 uses the input power spectra S(n, f) and S(n−1, f) of the nth and the (n−1)th frames as well as Eq. 2 to compute the change D(n) in the input power spectrum S(n, f) for the nth frame (step S313). In this way, the processor 21 is able to fulfill the function of the change calculator 111 illustrated by example in FIG. 1 by executing the processing in step S313.

Next, by conducting the processing in steps S314 to S316, the processor 21 uses the change D(n) computed in step S313 and Eq. 3 to compute an average change Dav(n) that acts as an index indicating the decrease per unit time in the reverb segment of the input signal x(t). First, the processor 21 determines whether or not the change D(n) in the input power spectrum S(n, f) for the nth frame is included in a range expressed by the values d1 and d2 (step S314). In the case of a positive determination in step S314, the processor 21 computes the average change Dav(n) up to the nth frame by multiplying the average change Dav(n−1) up to the (n−1)th frame and the change D(n) by the weights α and (1−α), respectively, and adding the results together (step S315).

Meanwhile, in the case of a negative determination in step S314, the processor 21 inherits the value of the average change Dav(n−1) up to the (n−1)th frame without change as the average change Dav(n) up to the nth frame (step S316). In this way, the processor 21 is able to fulfill the function of the index calculator 112 illustrated by example in FIG. 1, including the index calculator 112 and the averaging unit 114, by executing the processing in steps S314 to S316 enclosed by the box labeled S320 in FIG. 9.

Figure 10:
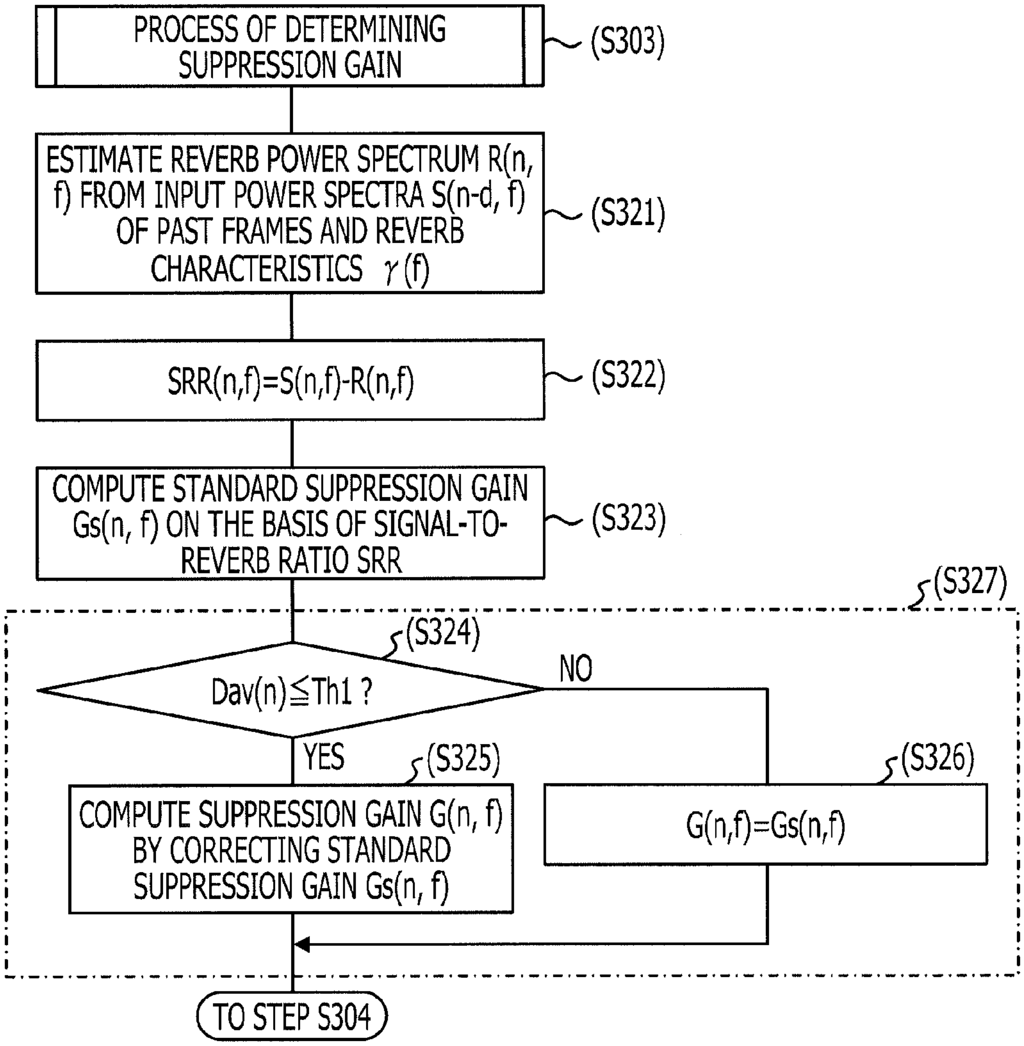
FIG. 10 is an exemplary flowchart of a process of determining suppression gain.

FIG. 10 is a flowchart of an exemplary process of determining suppression gain. The processing in steps S321 to S326 illustrated in FIG. 10 is an example of the processing in step S303 illustrated in FIG. 3. The processor 21 illustrated in FIG. 8 fulfills the function of the suppression controller 120 by executing the processing in steps S321 to S326 included in the flowchart illustrated in FIG. 10 in cooperation with respective components.

First, the processor 21 estimates the reverb power spectrum R(n, f) included in the input power spectrum S(n, f) of the current frame from the input power spectra S(n−d, f) (where d=1 to M) of past frames and the reverb characteristics γ(f) (step S321). The processor 21 may also use the above Eq. 8 and reverb characteristics γ(f) stored in the memory 22 for estimating the reverb power spectrum R(n, f), for example. In this way, the processor 21 is able to fulfill the functions of the reverb characteristics storage 121 and the estimator 122 illustrated by example in FIG. 1 by executing the processing in step S321 in cooperation with the memory 22.

Next, the processor 21 computes the signal-to-reverb ratio SRR(n, f) by subtracting the reverb power spectrum R(n, f) computed in step S321 from the input power spectrum S(n, f) of the current frame (step S322). Subsequently, the processor 21 computes a standard suppression gain Gs(n, f) on the basis of the signal-to-reverb ratio SRR(n, f) computed in step S322 (step S323). The processor 21 may also use a function like that illustrated in FIG. 7 to determine a standard suppression gain Gs(n, f) that corresponds to the value of the signal-to-reverb ratio SRR(n, f), for example. In this way, the processor 21 is able to fulfill the function of the gain calculator 123 illustrated by example in FIG. 1 by executing the processing in steps S322 and S323.

After that, the processor 21 determines the desirability of applying a reverberation suppression process to the input signal x(t), on the basis of a comparison between the average change Dav(n) obtained by the processing in the above step S302 and the first threshold Th1 (step S324). In the case where the average change Dav(n) is less than or equal to the first threshold Th1 (step S324, Yes), the processor 21 determines that there is low desirability to suppress reverb in the environment where the microphone 101 is placed. In this case, the processor 21 computes a suppression gain G(n, f) such that the attenuation rate is lower than the case of applying the standard suppression gain Gs(n, f) (step S325). In step S325, the processor 21 may, for example, uniformly set the suppression gain G(n, f) to a lower-limit value of 0 dB, regardless of the value of the standard suppression gain Gs(n, f) obtained in step S323.

In contrast, in the case where the average change Dav(n) is greater than the first threshold Th1 (step S324, No), the processor 21 determines that there is comparatively high reverb in the environment where the microphone 101 is placed. In this case, the processor 21 may simply take the standard suppression gain Gs(n, f) directly as the suppression gain G(n, f) (step S326).

In this way, the processor 21 is able to fulfill the function of the gain corrector 124 illustrated by example in FIG. 1 by executing the processing in steps S324 to S326 enclosed by the box labeled S327 in FIG. 10.

Additionally, on the basis of the suppression gain G(n, f) and the input power spectrum S(n, f) computed as above, the processor 21 computes a corrected power spectrum S'(n, f) in which the reverb component has been suppressed. The processor 21 may also, for example, compute a corrected power spectrum S'(n, f) corresponding to the output signal spectrum Y(n, f) by subtracting the suppression gain G(n, f) from the input power spectrum S(n, f) of the nth frame, as expressed in the above Eq. 10. Then, on the basis of the corrected power spectrum S'(n, f) obtained in this way, the processor 21 computes an output signal spectrum Y(n, f) according to the above Eq. 11. By executing such processes, the processor 21 is able to realize the function of the suppression applier 103 illustrated by example in FIG. 1.

An output signal y(t) may be generated by having the processor 21 apply an inverse fast Fourier transform to the output signal spectra Y(n, f) computed for respective frames in this way.

Thus, as a result of the processor 21 executing processing that determines a suppression gain G(n, f) on the basis of the slope of the change over time in an input signal x(t) in a reverb segment, it is possible to obtain an output signal y(t) in which suitable reverberation suppression has been applied, regardless of the magnitude of background noise. The processor 21 is then able to supply the output signal y(t) obtained in this way to the communication processor 105 for signal processing.

Thus, according to a mobile device 10 that includes the reverberation suppression device 100 illustrated by example in FIG. 8, the communication processor 105 is able to receive an output signal y(t) in which suitable reverberation suppression has been applied according to the environment in which the mobile device 10 is placed. At this point, the output signal y(t) passed to the communication processor 105 is a signal in which just the reverb segment reflected in the slope of change over time in the input signal x(t) in the reverb segment has been accurately suppressed. Consequently, the output signal y(t) faithfully reproduces the sound input into the microphone 101 without distortion.

In other words, according to a mobile device 10 that includes a reverberation suppression device 100, it is possible to transmit signals expressing clear sound via the communication processor 105 and a network to a mobile device or other device being used by the person with whom the user is communicating, regardless of the environment where the user is using the mobile device 10. Consequently, if the user of a mobile device 10 equipped with a reverberation suppression device 100 of the present disclosure has moved to or is currently in a bathroom, for example, it is possible for the user to conceal that fact from the person with whom he or she is communicating.

Figure 11:
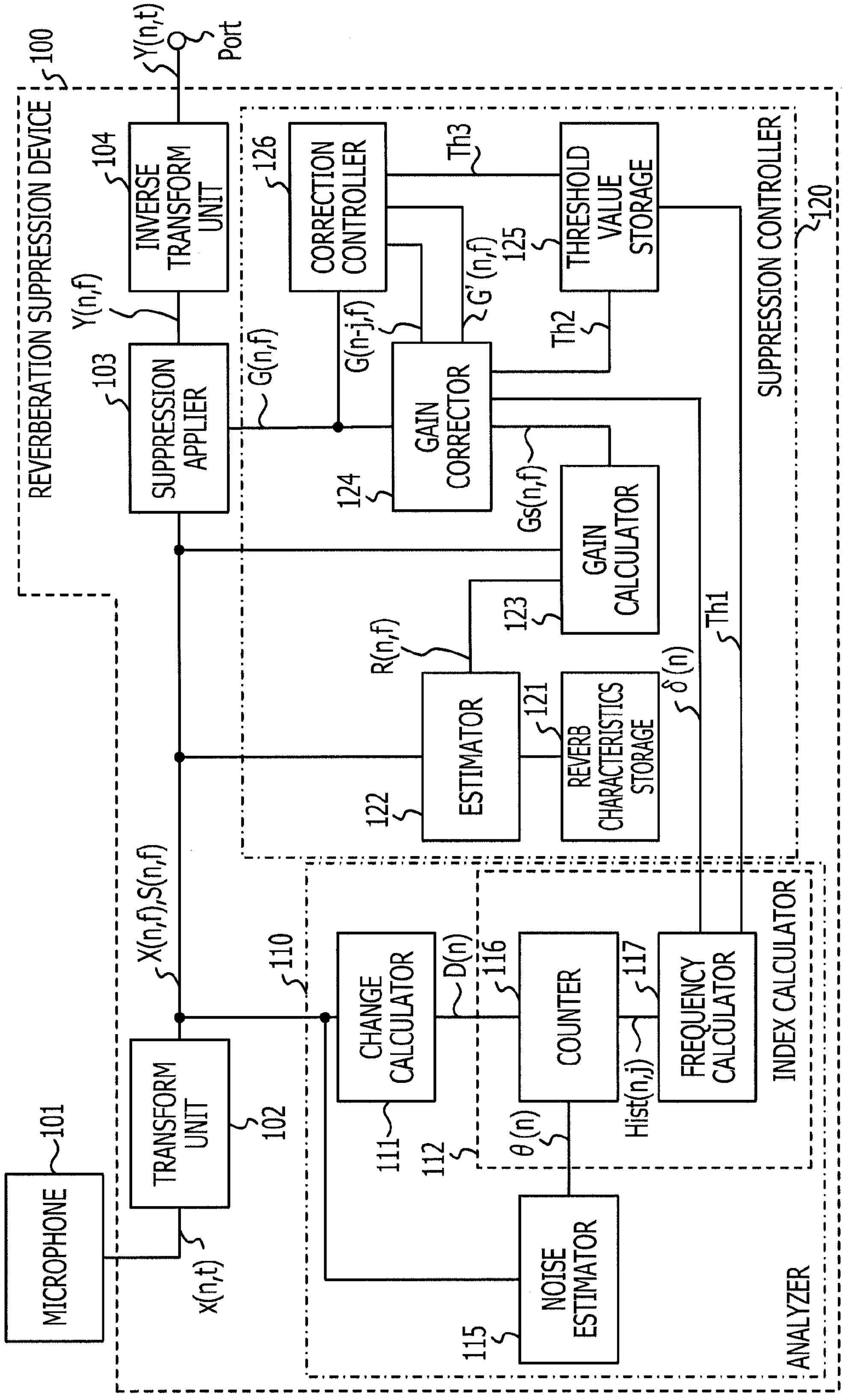
FIG. 11 is a diagram illustrating another embodiment of a reverberation suppression device.

FIG. 11 illustrates another embodiment of a reverberation suppression device 100. Herein, like reference signs are given to components illustrated in FIG. 11 that are equivalent to components illustrated in FIG. 1, and description of such components will be reduced or omitted.

The analyzer 110 illustrated by example in FIG. 11 includes a noise estimator 115. Also, the index calculator 112 of the analyzer 110 illustrated by example in FIG. 11 includes a counter 116 and a frequency calculator 117. Also, the suppression controller 120 illustrated by example in FIG. 11 includes a correction controller 126 in addition to the components illustrated by example in FIG. 1.

The noise estimator 115 estimates the signal-to-noise ratio (SNR) θ(n, f) of the input signal x(t) for the nth frame, on the basis of an input signal spectrum X(n, f) obtained by the transform unit 102. The noise estimator 115 may also, for example, use established technology to compute a noise power spectrum N(n, f) expressing the noise component on the basis of the input signal spectrum X(n, f) or the input power spectrum S(n, f). The noise estimator 115 may then compute the SNR θ(n, f) by subtracting the noise power spectrum N(n, f) from the input power spectrum S(n, f), as expressed in Eq. 12.

$$\theta(n,f)=S(n,f)-N(n,f) \tag{12}$$

The noise estimator 115 inputs SNRs θ(n, f) computed for respective frames in this way into the counter 116 included in the index calculator 112 illustrated by example in FIG. 11. In the case where an SNR θ(n, f) is greater than a given positive constant θ1, the counter 116 conducts a counting process discussed later, in which the target being counted is the change D(n) obtained by the change calculator 111 for that frame.

Herein, the above constant θ1 may be determined on the basis of the results of actual tests computing the SNR θ(n, f) for plural frames included in a reverb segment, for example. The input signal spectra X(n, f) of frames with an SNR θ(n, f) that is larger than such a constant θ1 faithfully reflect reverb-containing sound input into the microphone 101.

Consequently, on the basis of a comparison between the SNR θ(n, f) obtained by the noise estimator 115 and the above constant θ1, the counter 116 is able to count reliable changes D(n) obtained from frames that are weakly affected by the noise component.

The counter 116 counts the number of changes D(n) respectively occurring in N classes K1 to KN, which correspond to respective ranges obtained by splitting a range from Dmin to Dmax into N parts. Herein, Dmin and Dmax represent values considered to be the minimum and maximum values for the change D(n).

For example, in the case where the value of a change D(n) to be counted is less than the upper limit Kmaxp and equal to or greater than the lower limit Kminp of a range corresponding to the pth class Kp, the counter 116 may count the frequency of occurrence by updating the count for that class Kp.

The above processing by the counter 116 may also be expressed as in Eq. 13, as processing that updates a histogram Hist(n−1, j) (where j=1 to N) according to the comparison results between the SNR θ(n, f) and the constant θ1, with the histogram Hist(n−1, j) including counts for respective classes Kj (where j=1 to N) up to the (n−1)th frame. In this way, a histogram Hist(n, j) (where j=1 to N) may be obtained by adding the value 1 to Hist(n−1, p), which expresses a count of the number of times a class Kp includes a change D(n), but limited to the case where the SNR θ(n, f) of the current frame is greater than a given constant θ1.

$$Hist(n,\ j)=\begin{cases} Hist(n-1,\ j)+1 & \text{if } (j=p\ \&\ \theta(n)>\theta 1) \\ Hist(n-1,\ j) & \text{else} \end{cases} \tag{13}$$

By conducting such a counting process, the counter 116 is able to compute a histogram Hist(n, j) (where j=1 to N) for reliable changes D(n) occurring up to the nth frame. On the basis of a histogram Hist(n, j) (where j=1 to N) obtained in this way, the frequency calculator 117 calculates an index expressing the decrease per unit time in the reverb segment of an input signal x(t), as discussed later.

Figure 12A:
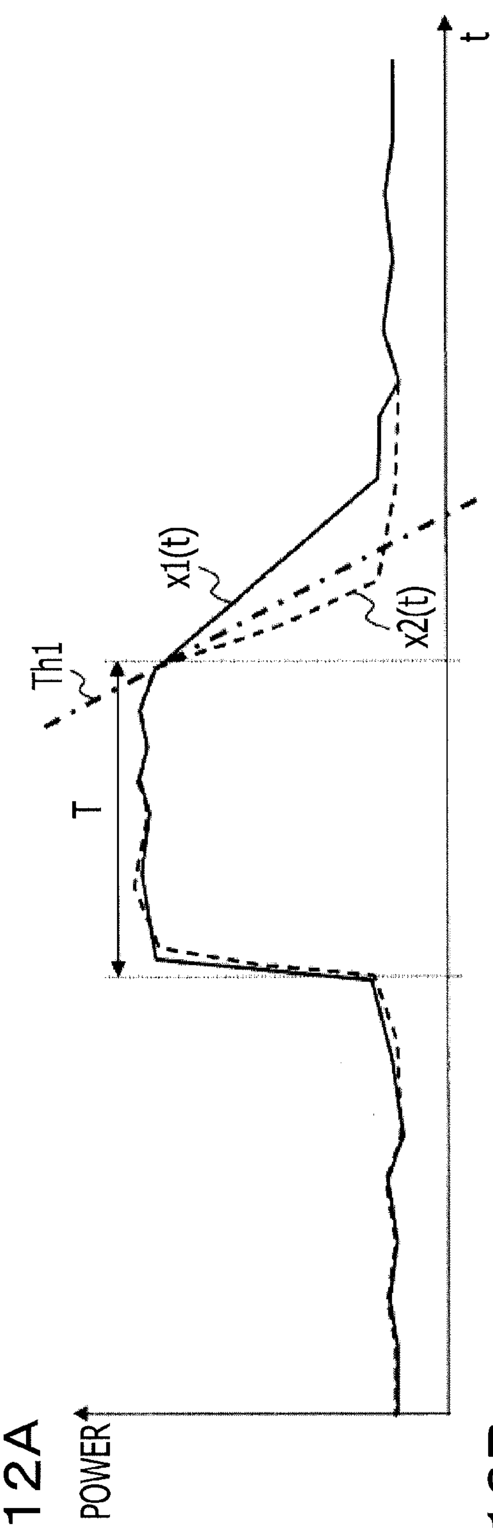
FIGS. 12A and 12B are diagrams explaining another example of processing by an index calculator.
Figure 12B:
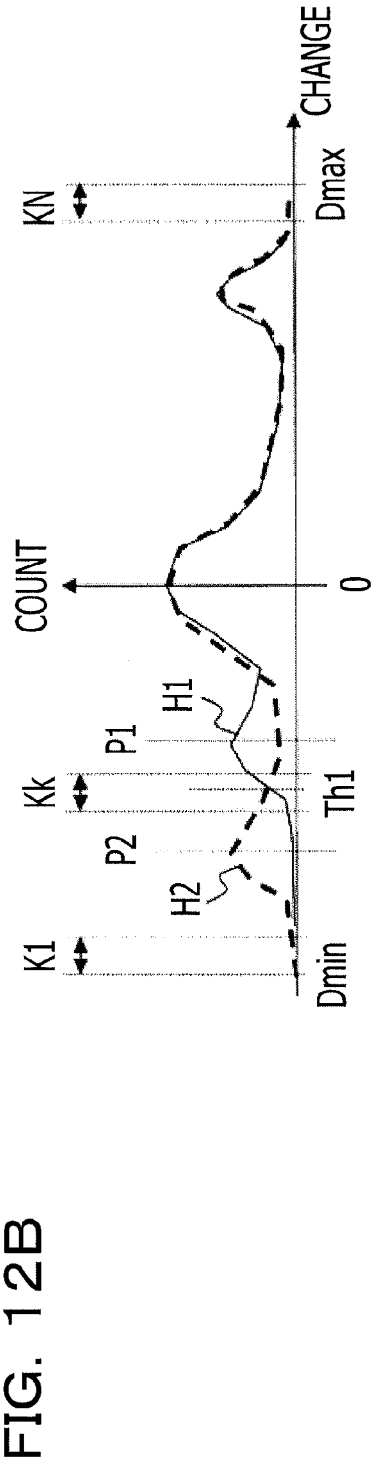

FIGS. 12A and 12B are diagrams explaining another example of processing by the index calculator 112. In FIG. 12A, the graph labeled x1(*t*) illustrates an example of change over time in an input signal x1(*t*) acquired in an environment with high reverb, such as a bathroom. Also, in FIG. 12A, the graph labeled x2(*t*) illustrates an example of change over time in an input signal x2(*t*) acquired in an environment with low reverb, such as a living room.

In FIG. 12A herein, the segment labeled T indicates a segment in which sound is produced. Also, in FIG. 12A, the line labeled Th1 is a line with a slope expressed by a decrease per unit time that corresponds to the first threshold Th1 discussed earlier.

In FIG. 12B, the graph labeled H1 illustrates a histogram H1 obtained by the counter 116 counting changes D(n) according to the above input signal x1(*t*). Also, in FIG. 12B, the graph labeled H2 illustrates a histogram H2 obtained by the counter 116 counting changes D(n) according to the above input signal x2(*t*). In FIG. 12B herein, the range labeled K1 is a first class K1 that takes the minimum value Dmin discussed earlier as its lower-limit value. Also, in FIG. 12B, the range labeled KN is a class KN that takes the maximum value Dmax discussed earlier as its upper-limit value.

The input signal x1(*t*) illustrated in FIG. 12A attenuates more gently in the reverb segment following the segment T in which sound is produced compared to the line that takes the first threshold Th1 as its slope. In contrast, attenuation in the reverb segment of the input signal x2(*t*) illustrated in FIG. 12A is sharper than the attenuation indicated by the line that takes the first threshold Th1 as its slope. Such differences are exhibited as different peak positions in the histograms H1 and H2 illustrated in FIG. 12B.

In the histogram H1 illustrated in FIG. 12B, P1 is the count peak corresponding to the decrease per unit time in the reverb segment of the input signal x1(*t*). In this way, the peak P1 of the histogram H1 for changes D(n) obtained for the input signal x1(*t*) that attenuates gently in the reverb segment becomes positioned closer to 0 change than the first threshold Th1. Meanwhile, in the histogram H2 illustrated in FIG. 12B, P2 is the count peak corresponding to the decrease per unit time in the reverb segment of the input signal x2(*t*). In this way, the peak P2 of the histogram H2 for changes D(n) obtained for the input signal x2(*t*) that attenuates sharply in the reverb segment appears farther from 0 change in the negative direction than the above first threshold Th1. Also note that in FIG. 12B, the range that corresponds to the class containing the first threshold Th1 is labeled Kk.

If change D(n) histograms are collected for a sufficient number of frames, a peak corresponding to the decrease per unit time in the reverb segment will appear in the histogram, as illustrated in FIG. 12B. The decrease per unit time of an input signal x(t) in the reverb segment may then be compared to the decrease corresponding to the first threshold Th1, on the basis of a comparison between the position of the peak in the histogram and the first threshold Th1. For example, if the position of the peak in the histogram is closer to 0 change than the first threshold Th1, this indicates that the attenuation rate of the input signal x(t) in the reverb segment is comparatively gentle. In contrast, if the peak in the histogram is positioned farther from 0 change in the negative direction than the first threshold Th1, this indicates that the input signal x(t) attenuates sharply in the reverb segment.

Such differences are also reflected as differences between frequencies δ1 and δ2, which express the ratios of total counts Sh1 and Sh2 distributed over the range to the left of the first threshold Th1 versus the overall total for the histograms H1 and H2 illustrated in FIG. 12B. For example, the example in FIG. 12B demonstrates that the frequency δ2, which is obtained for the histogram H2 corresponding to the input signal $x2(t)$ exhibiting sharp attenuation in the reverb segment, is greater than the frequency 61, which is obtained for the histogram H1 corresponding to the input signal $x1(t)$.

The above differences also appear in a histogram Hist(n, j) (where j=1 to N) obtained by the counter 116 counting changes D(n) for a number of frames that is less than the number of frames sufficient to obtain a histogram having a clear peak as illustrated in FIG. 12B.

In other words, as the decrease per unit time of an input signal x(t) in a reverb segment becomes larger, so too does a frequency δ(n) of changes D(n) which indicates that the decrease per unit time is equal to or greater than a given value in the histogram Hist(n, j) (where j=1 to N). Consequently, the frequency δ(n) of changes D(n) which indicates that the decrease per unit time is equal to or greater than a given value may be used as an index expressing the decrease per unit time of an input signal x(t) in a reverb segment.

The frequency calculator 117 illustrated by example in FIG. 11 may, for example, use Eq. 14 to calculate the frequency δ(n) at which a decrease greater than the decrease corresponding to the first threshold Th1 appears in the histogram Hist(n, j) (where j=1 to N). In Eq. 14, the frequency δ(n) is expressed using the total count Sh(n) contained in the classes from K1 to Kk and the total count Sha(n) contained in all classes, for example. Herein, the class Kk is the class to which belongs the change that indicates the decrease corresponding to the first threshold Th1. The frequency calculator 117 may also identify the class Kk containing the decrease expressed by the first threshold Th1 on the basis of the first threshold Th1 stored in the threshold value storage 125 illustrated by example in FIG. 11, for example.

$$\delta(n) = \frac{Sh(n)}{Sha(n)} = \frac{\sum_{j=1}^{k} (Hist(n, j))}{\sum_{j=1}^{N} (Hist(n, j))} \tag{14}$$

The index calculator 112 illustrated by example in FIG. 11 passes the frequency δ(n) calculated by the frequency calculator 117 as above to the suppression controller 120 as an index that indicates the decrease per unit time in the reverb segment of an input signal x(t).

A frequency δ(n) obtained in this way indicates the probability that the decrease per unit time in the reverb segment of an input signal x(t) is equal to or greater than a decrease corresponding to the slope indicated by the first threshold Th1. In the case where it is highly probable that the decrease per unit time in the reverb segment of an input signal x(t) is equal to or greater than a decrease corresponding to the slope indicated by the first threshold Th1, there is low desirability to apply a reverberation suppression process to the input signal x(t). Conversely, in the case where it is lowly probable that the decrease per unit time in the reverb segment of an input signal x(t) is equal to or greater than a decrease corresponding to the slope indicated by the first threshold Th1, it may be determined applying a reverberation suppression process to the input signal x(t) is highly desirable. Consequently, a second threshold Th2 for determining whether or not to apply a reverberation suppression process to an input signal x(t) may be set on the basis of the frequency δ(n), similarly to the average change Dav(n) discussed earlier. By storing the second threshold Th2 in the threshold value storage 125 illustrated by example in FIG. 11, the second threshold Th2 may also be used in processing by the suppression controller 120.

The value of the second threshold Th2 may also be determined on the basis of a frequency obtained using the above Eq. 14 for a histogram whose peak corresponding to changes obtained for respective frames included in a reverb segment is within a range corresponding to the class Kk that contains the first threshold Th1, for example.

The analyzer 110 that includes the noise estimator 115, counter 116, and frequency calculator 117 discussed above may be realized by the cooperative action of the processor 21 and the memory 22 illustrated in FIG. 8, similarly to the analyzer 110 illustrated by example in FIG. 1.

Figure 13:
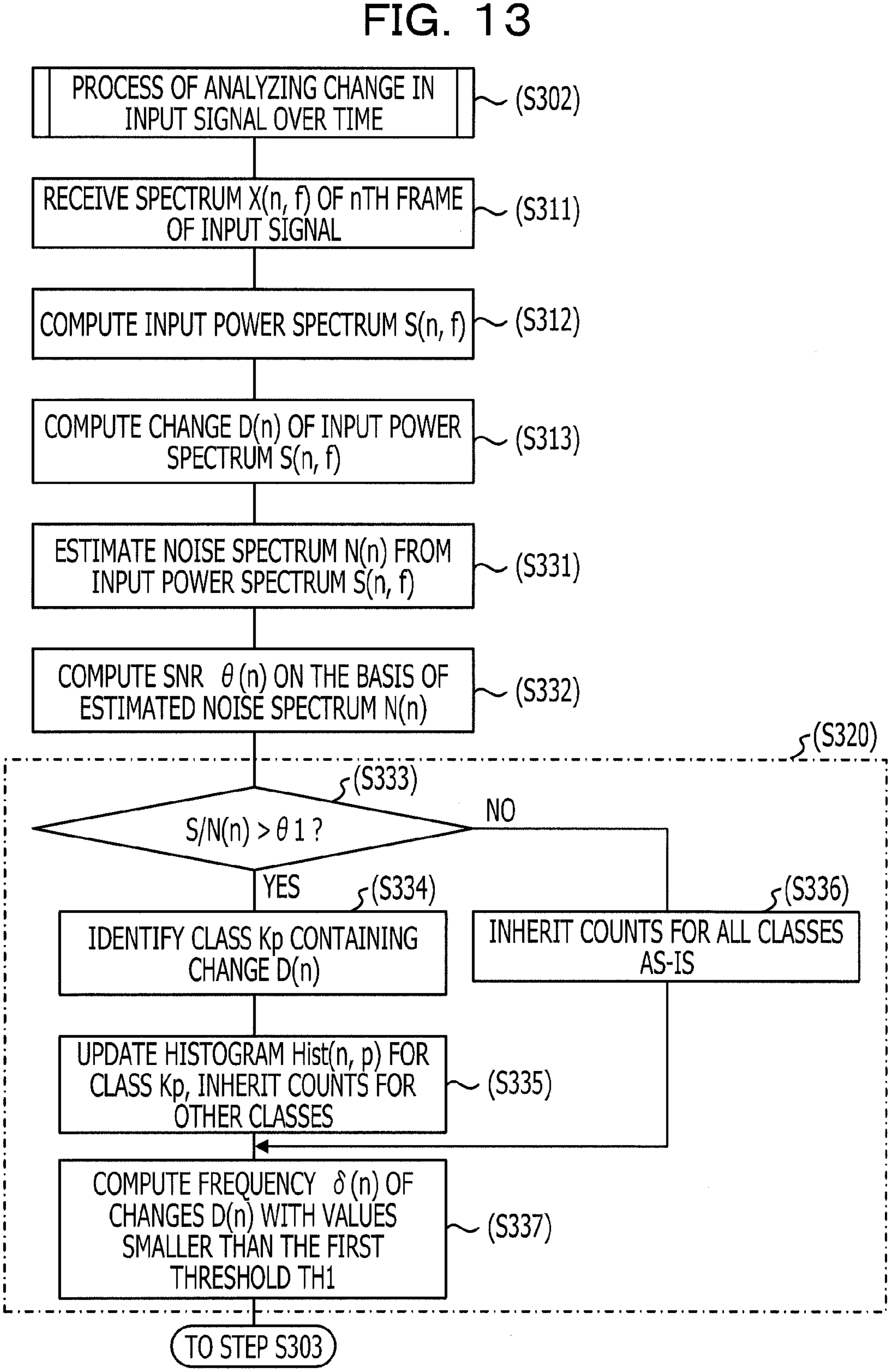
FIG. 13 is a flowchart of another exemplary process of analyzing change in an input signal over time.

FIG. 13 is a flowchart of another exemplary process of analyzing change over time in an input signal x(t).

Herein, like reference signs are given to steps illustrated in FIG. 13 that are equivalent to steps illustrated in FIG. 9, and description of such steps will be reduced or omitted. The processing in steps S311 to S313 and steps S331 to S337 illustrated in FIG. 13 is an example of the processing in step S302 illustrated in FIG. 3. The processor 21 illustrated in FIG. 8 fulfills the function of the analyzer 110 illustrated in FIG. 11 by executing the processing in the steps included in the flowchart illustrated in FIG. 13 in cooperation with respective components.

Following the processing in step S313, the processor 21 computes a noise power spectrum N(n, f) on the basis of the input power spectrum S(n, f) obtained in step S312 (step S331). Subsequently, the processor 21 computes an SNR θ(n) according to the above Eq. 12 using the noise power spectrum N(n, f) obtained in step S331 and the input power spectrum S(n, f) (step S332). In this way, the processor 21 is able to fulfill the function of the noise estimator 115 illustrated by example in FIG. 11 by executing the processing in steps S331 and S332.

Next, the processor 21 determines whether or not the SNR θ(n) computed in step S332 is greater than a given value θ1 (step S333). By executing the processing in steps S334 to S336 according to the determination result in step S333, the processor 21 counts a histogram Hist(n, j) (where j=1 to N) for changes D(n) up to the nth frame.

For example, in the case of a positive determination in step S333, the processor 21 first identifies the class Kp containing a change D(n) (step S334). Then, the processor 21 updates the histogram Hist(n, j) (where j=1 to N) in accordance with the occurrence of the change D(n) contained in the class Kp identified in step S334 (step S335). At this point, the processor 21 may add the value 1 to the count for the class Kp expressed by the histogram Hist(n−1, j) (where j=1 to N) up to the (n−1)th frame, while also inheriting the counts for other classes Kj (where j≠p) without change as the histogram Hist (n, j) (where j≠p). In contrast, in the case of a negative determination in step S333, the processor 21 may inherit the counts for each class Kj (where j=1 to N) expressed by the histogram Hist(n−1, j) (where j=1 to N) without change as the histogram Hist(n, j) (where j=1 to N) (step S336). In this way, the processor 21 is able to fulfill the function of the counter 116 illustrated by example in FIG. 11 by executing the processing in steps S334 to S336 according to the determination result in step S333.

Subsequently, the processor 21 uses the above Eq. 14 to compute the frequency δ(n) of changes D(n) with values smaller than the first threshold Th1 in the histogram Hist(n, j) (where j=1 to N) up to the nth frame (step S337). In this way, the processor 21 is able to fulfill the function of the frequency calculator 117 illustrated by example in FIG. 11 by conducting the processing in step S337.

In addition, the processor 21 is able to fulfill the function of the index calculator 112 illustrated by example in FIG. 11, including the counter 116 and the frequency calculator 117, by executing the processing in the steps enclosed by the box labeled S320 in the flowchart illustrated in FIG. 13.

In the reverberation suppression device 100 illustrated by example in FIG. 11, the frequency calculator 117 informs the suppression controller 120 of the frequency δ(n) obtained as above as an index that indicates the decrease per unit time in the reverb segment of an input signal x(t).

The threshold value storage 125 included in the suppression controller 120 illustrated by example in FIG. 11 also stores information expressing a third threshold Th3 in addition to information expressing the first threshold Th1 and the second threshold Th2 discussed above. Additionally, the correction controller 126 illustrated by example in FIG. 11 controls computation of a suppression gain G(n, f) by the gain corrector 124 on the basis of the suppression gain G(n−j, f) (where j=1 to m) input into the suppression applier 103 prior to the nth frame and the third threshold Th3.

First, on the basis of a frequency δ(n) obtained by the analyzer 110, the gain corrector 124 illustrated by example in FIG. 11 computes a corrected gain G'(n, f) that reflects the decrease per unit time in the reverb segment of an input signal x(t). The gain corrector 124 may also set the corrected gain G'(n, f) to the standard suppression gain Gs(n, f) or a given value of 0 dB according to comparison results between the frequency δ(n) and the second threshold Th2 expressed by information stored in the threshold value storage 125, as expressed in Eq. 15, for example. Namely, the gain corrector 124 takes the corrected gain G'(n, f) to be the standard suppression gain Gs(n, f) in the case where there is a low probability that the decrease per unit time of an input signal x(t) in the reverb segment is equal to or greater than a decrease corresponding to the slope indicated by the first threshold Th1. In contrast, the gain corrector 124 takes the corrected gain G'(n, f) to be 0 dB in the case where there is a high probability that the decrease per unit time in reverb segment of an input signal x(t) is equal to or greater than a decrease corresponding to the slope indicated by the first threshold Th1.

$$G'(n,f)=\begin{cases} Gs(n,f) & \text{if } (\delta(n)\le Th2) \\ 0\text{ dB} & \text{else} \end{cases} \tag{15}$$

In this way, the correction controller 126 controls computation of a suppression gain G(n, f) as follows, on the basis of the corrected gain G'(n, f) for the nth frame obtained by the gain corrector 124 and the suppression gain G(n−j, f) (where j=1 to m) of the last m frames.

First, on the basis of the suppression gain G(n−j, f) (where j=1 to m) of the last m frames and the corrected gain G'(n, f) for the nth frame, the correction controller 126 computes an index indicating the slope of the magnitude of the suppression gain G(n, f) in a period up to the nth frame. The correction controller 126 may compute an average gain Gav(n, f) as expressed in Eq. 16 as the index indicating the slope of the magnitude of the suppression gain G(n, f) up to the nth frame, for example.

$$Gav(n,f)=\beta Gav(n-1,f)+(1-\beta)G'(n,f) \tag{16}$$

According to Eq. 16, the average gain Gav(n, f) up to the nth frame is the result of weighted addition of the average gain Gav(n−1, f) up to the (n−1)th frame and the corrected gain G'(n, f) of the nth frame, with the weights expressed by a given weighting coefficient β. By suitably adjusting the value of this weighting coefficient β, from Eq. 16 it is possible to compute an average gain Gav(n, f) that reflects the magnitude of the suppression gain G(n−j, f) (where j=1 to m) applied to the last m frames preceding the current frame.

The correction controller 126 may then determine the desirability of applying reverberation suppression to the input signal x(n, t) of the nth frame on the basis of a comparison between the average gain Gav(n, f) computed in this way and a given third threshold Th3. The value of the third threshold Th3 may, for example, be determined on the basis of a minimum suppression gain at which human hearing may perceive differences between sound played back from an output signal y(t) with suppression gain applied by the suppression applier 103, and sound played back from an output signal y(t) without suppression gain applied.

For example, the correction controller 126 may determine that there is low desirability to apply reverberation suppression in the case where the average gain Gav(n, f) is less than or equal to the third threshold Th3, or in other words, in the case where the suppression effect over the past several frames is miniscule to a degree that might not be humanly perceivable. In this case, the correction controller 126 causes the gain corrector 124 to compute a suppression gain G(n, f) with a value smaller than the corrected gain G'(n, f). In contrast, the correction controller 126 may determine that there is high desirability to apply reverberation suppression in the case where the average gain Gav(n, f) is greater than the third threshold Th3, or in other words, in the case where the suppression effect over the past several frames is large to a degree that may be humanly perceivable. In this case, the correction controller 126 causes the gain corrector 124 to output a corrected gain G'(n, f) computed using Eq. 15, for example, directly as the suppression gain G(n, f).

Consequently, the suppression gain G(n, f) computed by the gain corrector 124 illustrated by example in FIG. 11 becomes the corrected gain G'(n, f), but limited to the case where the average gain Gav(n, f) is greater than the third threshold Th3, as expressed in Eq. 17. Otherwise, the suppression gain G(n, f) computed by the gain corrector 124 becomes 0 dB.

$$G(n,f)=\begin{cases} G'(n,f) & \text{if } (Gav(n,f)>Th3) \\ 0\text{ dB} & \text{else} \end{cases} \tag{17}$$

By applying such control, the correction controller 126 is able to stop reverberation suppression exercised on the input signal x(n, t) of a frame where the efficacy of reverberation suppression is anticipated to be slight, and reduce distortion in sound played back from the output signal y(n, t).

The suppression controller 120 that includes the gain corrector 124 and the correction controller 126 illustrated by example in FIG. 11 may be realized by the cooperative action of the processor 21 and the memory 22 illustrated in FIG. 8, similarly to the suppression controller 120 illustrated by example in FIG. 1.

Figure 14:
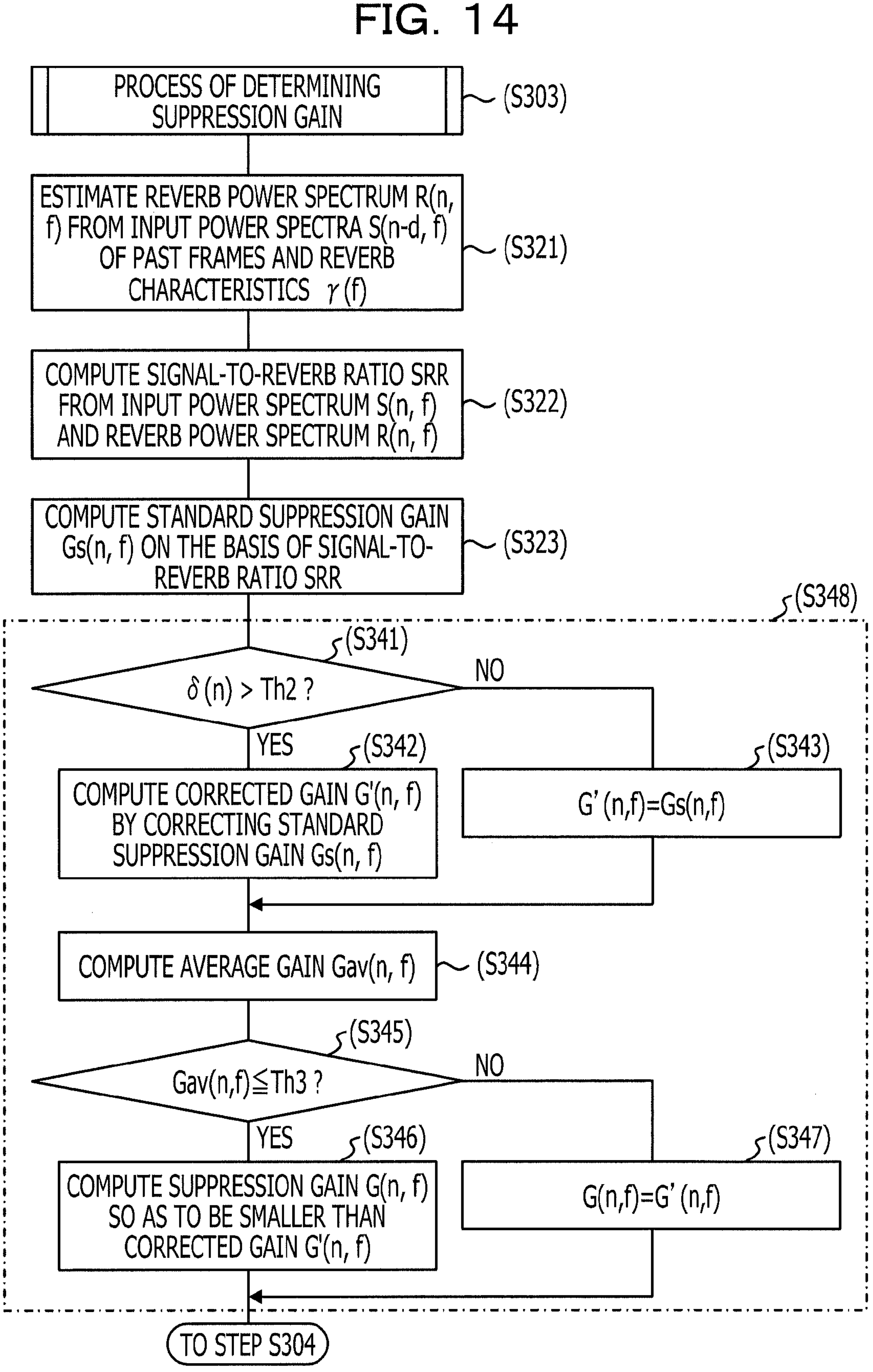
FIG. 14 is another exemplary flowchart of a process of determining suppression gain.

FIG. 14 is a flowchart of another exemplary process of determining suppression gain. Herein, like reference signs are given to steps illustrated in FIG. 14 that are equivalent to steps illustrated in FIG. 10, and description of such steps will be reduced or omitted. The processing in steps S321 to S323 and steps S341 to S347 illustrated in FIG. 14 is an example of the processing in step S303 illustrated in FIG. 3. The processor 21 illustrated in FIG. 8 fulfills the function of the suppression controller 120 illustrated in FIG. 11 by executing the processing in the steps included in the flowchart illustrated in FIG. 14 in cooperation with respective components.

Following the processing in step S323, the processor 21 determines the desirability of applying the reverberation suppression process to the input signal x(t), on the basis of a comparison between the frequency δ(n) obtained by the processing in the above step S337 and the second threshold Th2 (step S341). In the case where the frequency δ(n) is greater than the second threshold Th2 (step S341, Yes), the processor 21 determines that there is low desirability to suppress reverb in the environment where the microphone 101 is placed. In this case, the processor 21 computes a corrected gain G'(n, f) with a value that is smaller than the standard suppression gain Gs(n, f) (such as a value of 0 dB, for example), similarly to step S325 illustrated in FIG. 10 (step S342). In contrast, in the case where the frequency δ(n) is less than or equal to the second threshold Th2 (step S341, No), the processor 21 takes the standard suppression gain Gs(n, f) directly as the corrected gain G'(n, f), similarly to step S326 illustrated in FIG. 10 (step S343).

In this way, by executing the processing in steps S341 to S343 the processor 21 is able to fulfill the function of the gain corrector 124 which computes a corrected gain G'(n, f) on the basis of comparison results between the above frequency δ(n) and the second threshold Th2.

Next, the processor 21 uses the above Eq. 16 to compute an average gain Gav(n, f) as an index indicating the slope of magnitude of the suppression gain G(n, f) up to the nth frame (step S344). Subsequently, the processor 21 determines whether or not the average gain Gav(n, f) obtained by the processing in step S344 is less than or equal to the third threshold Th3 (step S345). In the case of a positive determination in step S345, the processor 21 determines that there is low desirability to apply reverberation suppression. In this case, the processor 21 computes a suppression gain G(n, f) with a value that is smaller than the above corrected gain G'(n, f) (such as a value of 0 dB, for example) (step S346). In contrast, in the case of a negative determination in step S345, the processor 21 determines that there is high desirability to apply reverberation suppression. In this case, the processor 21 takes the above corrected gain G'(n, f) directly as the suppression gain G(n, f) (step S347).

In this way, by executing the processing in the steps enclosed by the box labeled S348 in FIG. 14, the processor 21 is able to fulfill the function of the gain corrector 124 computing a suppression gain G(n, f) under control by the correction controller 126 illustrated by example in FIG. 11.

However, the respective units included in the analyzer 110 and the suppression controller 120 illustrated in FIGS. 1 and 11 are not limited to the combinations illustrated by example in FIGS. 1 and 11, and may be applied in a variety of combinations.

For example, the correction controller 126 illustrated by example in FIG. 11 may also be applied to the suppression controller 120 illustrated in FIG. 1. Similarly, the index calculation process conducted by the index calculator 112 that includes the selector 113 and the averaging unit 114 illustrated in FIG. 1 may also be controlled according to whether or not an SNR θ(n, f) estimated by the noise estimator 115 illustrated in FIG. 11 is equal to or greater than the constant θ1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A reverberation suppression device comprising:

an analyzer configured to analyze a change in frames of an input audio signal over time in a spectra power of the input audio signal obtained from a microphone in response to a sound input, and thereby compute a decrease per unit time in the spectra power of the input audio signal in a reverb segment following an end of a segment in which sound is capable of being generated, the decrease per unit time is computed on basis of a peak position of a histogram computed by counting occurrences of changes in the spectra power of frames of the input audio signal; and a suppression controller configured to control, for an output audio signal on basis of the input audio signal, a suppression gain which indicates a rate at which the input audio signal is attenuated, on basis of the peak position of the histogram.

2. The reverberation suppression device according to claim 1, the analyzer further comprising:

a change calculator configured to calculate the change in the spectra power of the frames of the input audio signal, the frames being units of frequency analysis of the input audio signal, and the change being calculated on basis of a difference between respective frequency components included in a spectrum of a given frame of the input audio signal, and respective frequency components included in a spectrum computed for a frame preceding a given frame; and an index calculator configured to calculate an index indicating the decrease per unit time in a spectra power of the input audio signal in the reverb segment, on basis of the change in the spectra power of the frames of the input audio signal.

3. The reverberation suppression device according to claim 2, the analyzer further comprising:

a noise estimator configured to estimate a signal-to-noise ratio for the frames;

wherein the index calculator computes an index indicating the decrease per unit time in the spectra power of the input audio signal in the reverb segment by using the change obtained for the frames which signal-to-noise ratio as estimated by the noise estimator is equal to or greater than a preset, given value.

4. The reverberation suppression device according to claim 2, the suppression controller further comprising:

an estimator configured to estimate a reverb component included in the input audio signal spectrum of a current frame, on the basis of the input audio signal spectra of plural frames preceding the current frame that is being subjected to reverberation suppression, and a reverb characteristics of a indoor area where the microphone is placed;

a gain calculator configured to calculate a standard suppression gain equivalent to a ratio that attenuates the input audio signal spectrum of the current frame in order to remove the reverb component estimated by the estimator; and a gain corrector configured to compute a suppression gain to apply to the input audio signal by correcting the standard suppression gain on basis of the calculated index indicating the decrease per unit time in the spectra power of the input audio signal in the reverb segment obtained as analysis results from the analyzer.

5. The reverberation suppression device according to claim 4, wherein the index calculator calculates an average change obtained by averaging changes included in a given range anticipated to contain the changes in the reverb segment from calculation results from the change calculator, and takes the calculated average change as the index indicating the decrease per unit time in the spectra power of the input audio signal in the reverb segment, and the gain corrector applies correction so as to make the suppression gain applied to the current frame of the input audio signal spectra smaller than the standard suppression gain in the case where the decrease per unit time indicated by the average change is greater than a given first threshold indicating a given decrease per unit time.

6. The reverberation suppression device according to claim 4, wherein the index calculator calculates a frequency of changes indicating that the decrease per unit time is equal to or greater than a given decrease on basis of the histogram computed by counting occurrences of the changes obtained by the change calculator, and takes the calculated frequency of changes as the index indicating the decrease per unit time in the spectra power of the input audio signal in the reverb segment, and the gain corrector applies a correction so as to make the suppression gain applied to the current frame of the input audio signal spectra smaller than the standard suppression gain in the case where the frequency of changes indicating that the decrease per unit time is equal to or greater than a given decrease per unit time exceeding a given second threshold.

7. The reverberation suppression device according to claim 4, the suppression controller further comprising:

a correction controller configured to monitor the suppression gain applied to the frames, and thereby control the gain corrector so as to decrease the suppression gain applied to the current frame of the input audio signal spectra in the case of detecting that the suppression gain applied to frames preceding the current frame has a slope that is less than a given third threshold.

8. A reverberation suppression method comprising:

transforming an input audio signal into frames in time;

analyzing a change over the frames in the time in a spectra power of an input audio signal obtained from a microphone in response to a sound input;

computing, by a processor, a decrease per unit time in the spectra power of the input audio signal in a reverb segment following an end of a segment in which sound is capable of being generated, the decrease per unit time is computed on basis of a peak position of a histogram computed by counting occurrences of changes in the spectra power of frames of the input audio signal; and controlling, for an output audio signal on basis of the input audio signal, a suppression gain which indicates a rate at which the input audio signal is attenuated, on basis of the the peak position of the histogram.

9. A non-transitory computer-readable storage medium storing a reverberation suppression program that causes a computer to execute a process comprising:

transforming an input audio signal into frames in time;

analyzing a change over the frames in time in a spectra power of an input audio signal obtained from a microphone in response to a sound input;

computing a decrease per unit time in the spectra power of the input audio signal in a reverb segment following an end of a segment in which sound is capable of being generated, the decrease per unit time is computed on basis of a peak position of a histogram computed by counting occurrences of changes in the spectra power of frames of the input audio signal; and controlling, for an output audio signal on basis of the input audio signal, a suppression gain which indicates a rate at which the input audio signal is attenuated, on basis of the peak position of the histogram.

10. The non-transitory computer-readable storage medium according to claim 9, the analyzing of characteristics of change over time in the spectra power of the input signal further comprising:

calculating the change in the spectra power of the frames of the input audio signal, the frames being units of frequency analysis of the input audio signal, and the change being calculated on basis of a difference between respective frequency components included in a spectrum of a given frame of the input audio signal, and respective frequency components included in a spectrum computed for a frame preceding a given frame; and calculating an index indicating the decrease per unit time in a spectra power of the input audio signal in the reverb segment, on basis of the change in the spectra power of the frames of the input audio signal.

11. The non-transitory computer-readable storage medium according to claim 10, the analyzing of characteristics of change over time in the spectra power of the input signal further comprising:

estimating a signal-to-noise ratio for the frames;

wherein the calculating of the index includes calculating an index indicating the decrease per unit time in the spectra power of the input audio signal in the reverb segment by using the change obtained for the frames which signal-to-noise ratio is determined to be equal to or greater than a preset, given value.

12. The non-transitory computer-readable storage medium according to claim 10, the controlling of the suppression gain applied to the input signal further comprising:

estimating a reverb component included in the input audio signal spectrum of a current frame, on basis of the input audio signal spectra of plural frames preceding the current frame that is being subjected to reverberation suppression, and a reverb characteristics of a indoor area where the microphone is placed;

calculating a standard suppression gain equivalent to a ratio that attenuates the input audio signal spectrum of the current frame in order to remove the estimated reverb component; and computing a suppression gain to apply to the audio input signal by correcting the standard suppression gain on basis of the calculated index indicating the decrease per unit time in the spectra power of the input audio signal in the reverb segment.

13. The non-transitory computer-readable storage medium according to claim 12, wherein the calculating of an index indicating the characteristics of change over time in the spectra power of the input signal in the reverb segment includes calculating an average change obtained by averaging changes included in a given range anticipated to contain the changes in the reverb segment, and taking the calculated average change the an index indicating the decrease per unit time in the spectra power of the input audio signal in the reverb segment, and the computing of a suppression gain includes applying correction so as to make the suppression gain applied to the current frame of the input audio signal spectra smaller than the standard suppression gain in the case where the decrease per unit time indicated by the average change is greater than a given first threshold indicating a given decrease per unit time.

14. The non-transitory computer-readable storage medium according to claim 12, wherein the calculating of an index indicating the characteristics of change over time in the spectra power of the input signal in the reverb segment includes calculating a frequency of changes indicating that the decrease per unit time is equal to or greater than a given decrease on basis of e the histogram computed by counting occurrences of the changes, and taking the calculated frequency of changes as the index indicating the decrease per unit time in the spectra power of the input signal in the reverb segment, and the computing of a suppression gain includes applying a correction so as to make the suppression gain applied to the current frame of the input audio signal spectra smaller than the standard suppression gain in the case where the frequency of changes indicating that the decrease per unit time is equal to or greater than a given decrease per unit time exceeding a given second threshold.

15. The non-transitory computer-readable storage medium according to claim 12, the controlling of the suppression gain applied to the input signal further comprising:

monitoring the suppression gain applied to the frames, and thereby controlling the computing of a suppression gain so as to decrease the suppression gain applied to the current frame of the input audio signal spectra in the case of detecting that the suppression gain applied to frames preceding the current frame has a slope that is less than a given third threshold.

* * * * *

UNITED STATES PATENT AND TRADEMARK OFFICE

CERTIFICATE OF CORRECTION

PATENT NO. : 9,093,077 B2
APPLICATION NO. : 13/532908
DATED : July 28, 2015
INVENTOR(S) : Otani et al.

It is certified that error appears in the above-identified patent and that said Letters Patent is hereby corrected as shown below:

In the claims

Claim 8, Column 23, Lines 59-60

Delete "on basis of the the" and insert --on the basis of the--, therefor.

Claim 13, Column 24, Line 65

Delete "the an" and insert --the--, therefor.

Claim 14, Column 25, Line 14

Delete "basis of e the" and insert --the basis of the--, therefor.

Signed and Sealed this
Eighth Day of December, 2015

Michelle K. Lee

Michelle K. Lee
*Director of the United States Patent and Trademark Office*